(12) United States Patent
Ogawa

(10) Patent No.: US 10,350,907 B2
(45) Date of Patent: Jul. 16, 2019

(54) PRINTING APPARATUS, PRINTING SYSTEM, PRINTING CONTROL METHOD AND COMPUTER-READABLE RECORDING MEDIUM

(71) Applicant: CASIO COMPUTER CO., LTD., Tokyo (JP)

(72) Inventor: Naoki Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/884,170

(22) Filed: Jan. 30, 2018

(65) Prior Publication Data

US 2018/0257395 A1    Sep. 13, 2018

(30) Foreign Application Priority Data

Mar. 9, 2017    (JP) .................................. 2017-044447

(51) Int. Cl.
  *B41J 2/36* (2006.01)
  *B41J 2/355* (2006.01)
  (Continued)

(52) U.S. Cl.
  CPC ............... *B41J 2/3558* (2013.01); *B41J 2/32* (2013.01); *B41J 2/325* (2013.01); *B41J 2/355* (2013.01);
  (Continued)

(58) Field of Classification Search
  CPC ... B41J 2/36; B41J 2/365; B41J 2/3558; B41J 2/325; B41J 3/4075; B41J 2/32;
  (Continued)

(56) References Cited

U.S. PATENT DOCUMENTS

| | | | | |
|---|---|---|---|---|
| 4,560,993 A | * | 12/1985 | Hakoyama | B41J 2/365 347/182 |
| 4,568,817 A | * | 2/1986 | Leng | B41J 2/38 347/172 |
| 5,025,267 A | * | 6/1991 | Schofield | B41J 2/355 347/186 |
| 5,581,294 A | * | 12/1996 | Fujii | B41J 2/345 347/183 |
| 6,357,348 B1 | * | 3/2002 | Nakamura | B41J 2/32 101/128.4 |

(Continued)

FOREIGN PATENT DOCUMENTS

| | | | | |
|---|---|---|---|---|
| JP | 60-255463 | * | 12/1985 | B41J 2/32 |
| JP | H10-109435 | | 4/1998 | |

(Continued)

*Primary Examiner* — Huan H Tran
(74) *Attorney, Agent, or Firm* — Fitch, Even, Tabin & Flannery LLP

(57) ABSTRACT

A printing apparatus includes a thermal head and a processor. The thermal head includes heat-generating elements and prints on a plurality of lines in a medium. The processor sets a second period within one of the setting periods. The second period is a time period for adjusting a temperature change of the heat-generating elements without printing on the medium, after a first period for printing. The processor determines a $n^{th}$ line (n: an integer of 2 or greater) among the lines based on printing data. The $n^{th}$ line is estimated to have a possibility of sticking in printing. The processor adjusts a temperature change of at least a part of the heat-generating elements in the second periods corresponding to at least the $n^{th}$ line and a $(n-1)^{th}$ line. The $(n-1)^{th}$ line is printed immediately before the $n^{th}$ line based on the printing data, to suppress the sticking.

17 Claims, 19 Drawing Sheets

(51) Int. Cl.
    *G06K 15/02*     (2006.01)
    *B41J 3/407*     (2006.01)
    *B41J 2/325*     (2006.01)
    *B41J 2/32*     (2006.01)
    *B41J 2/365*     (2006.01)

(52) U.S. Cl.
    CPC ............. *B41J 2/3551* (2013.01); *B41J 2/365* (2013.01); *B41J 3/4075* (2013.01); *G06K 15/028* (2013.01); *G06K 15/024* (2013.01)

(58) Field of Classification Search
    CPC ....... B41J 2/355; B41J 2/3555; G06K 15/024; G06K 15/028
    See application file for complete search history.

(56) References Cited

U.S. PATENT DOCUMENTS

| | | | | |
|---|---|---|---|---|
| 6,670,976 | B2* | 12/2003 | Watanabe | B41J 2/355 |
| | | | | 347/186 |
| 2018/0257394 | A1* | 9/2018 | Ito | B41J 2/355 |
| 2018/0257396 | A1* | 9/2018 | Ogawa | B41J 2/3558 |
| 2018/0272747 | A1* | 9/2018 | Ito | B41J 2/3555 |

FOREIGN PATENT DOCUMENTS

| | | | | |
|---|---|---|---|---|
| JP | 2009-269354 | * | 11/2009 | B41J 2/365 |
| JP | 2013-010200 A | | 1/2013 | |
| JP | 2013-052539 A | | 3/2013 | |

* cited by examiner

| APPLICATION TABLE | | | |
|---|---|---|---|
| TEMPERATURE (°C) | MAIN APPLICATION TIME (μs) | HISTORY APPLICATION TIME (μs) | COUNTERMEASURE APPLICATION TIME (μs) |
| 0 | 449 | 300 | 100 |
| 1 | 443 | 296 | 99 |
| 2 | 438 | 292 | 97 |
| 3 | 432 | 288 | 96 |
| 4 | 426 | 284 | 95 |
| 5 | 421 | 280 | 93 |
| ⋮ | ⋮ | ⋮ | ⋮ |
| 28 | 287 | 191 | 64 |
| 29 | 281 | 188 | 63 |
| 30 | 274 | 183 | 61 |
| 31 | 269 | 179 | 60 |
| 32 | 265 | 177 | 59 |
| ⋮ | ⋮ | ⋮ | ⋮ |
| 60 | 190 | 126 | 42 |
| 61 | 188 | 125 | 42 |
| 62 | 186 | 124 | 41 |
| 63 | 184 | 123 | 41 |
| 64 | 183 | 122 | 41 |
| 65 | 182 | 121 | 40 |

TB1

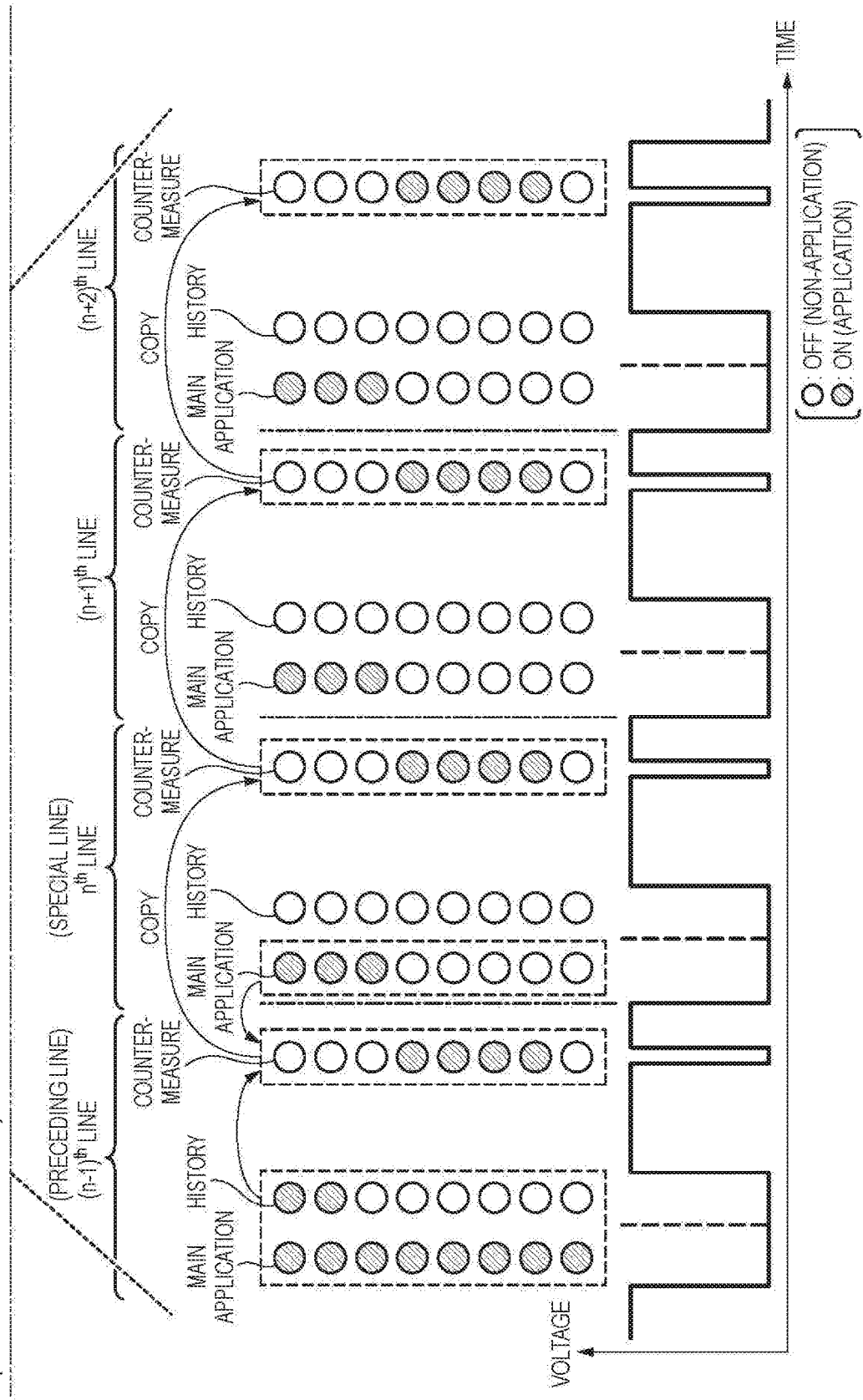

PRINTING APPARATUS, PRINTING SYSTEM, PRINTING CONTROL METHOD AND COMPUTER-READABLE RECORDING MEDIUM

CROSS-REFERENCE TO RELATED APPLICATIONS

The present application claims the benefit of priority of Japanese Patent Application No. 2017-044447, filed on Mar. 9, 2017, the content of which is incorporated herein by reference.

BACKGROUND OF THE INVENTION

1. Field of the Invention

The disclosure relates to a printing apparatus, a printing system, a printing control method, and a computer-readable recording medium.

2. Description of the Related Art

In the related art, a printing apparatus configured to control application to heat-generating elements provided to a thermal head and to transfer ink applied to an ink ribbon to a medium to be printed for printing has been known.

In the printing apparatus having adopted a thermal transfer method, a phenomenon referred to as 'sticking' that the ink ribbon is stuck to the thermal head when a rapid temperature change from high temperatures to low temperatures occurs in the thermal head may occur. When the sticking occurs, it is not possible to normally wind the ink ribbon. Thereby, a region in which the printing is not normally performed is partially generated, so that a printing quality is remarkably deteriorated.

JP-A-2013-052539 discloses a thermal printer configured to suppress sticking by chopper control. The chopper control is a technology of frequently switching application/non-application to the thermal head. By performing the chopper control, it is possible to suppress the rapid temperature change of the thermal head.

When a circuit for chopper control is added to the printing apparatus, the manufacturing cost of the product increases. In the meantime, implementation of the chopper control by software makes a control program complicated and causes the size to increase.

For this reason, a control that can suppress the sticking and is simpler than the chopper control is needed in the printing apparatus.

BRIEF SUMMARY OF THE INVENTION

According to one aspect of the present invention, a printing apparatus includes a thermal head and a processor. The thermal head is configured to print an image on a plurality of lines in a medium. The thermal head includes a plurality of heat-generating elements configured to generate heat when a voltage is applied thereto, and the thermal head is controlled to print on the plurality of lines in the medium in setting periods. The processor is configured to: set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium; determine a $n^{th}$ line (n: an integer of 2 or greater) among the plurality of lines in the medium based on printing data for printing the image, the $n^{th}$ line being a line estimated to have a possibility of sticking in printing on the medium by the thermal head; and adjust a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

According to another aspect of the present invention, a printing apparatus includes a thermal head and a processor. The thermal head is configured to print an image on a plurality of lines on a medium. The thermal head includes a plurality of heat-generating elements configured to generate heat when a voltage is applied thereto, and the thermal head is controlled to print on the plurality of lines in the medium in setting periods. The processor is configured to: set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium; adjust a temperature change of at least a part of the plurality of heat-generating elements in the second periods corresponding to at least a $n^{th}$ line (n: an integer of 2 or greater) being a line estimated to have a possibility of sticking and a $(n-1)^{th}$ line as a target line group, the $(n-1)^{th}$ line is to be printed immediately before printing of the $n^{th}$ line, so as to suppress the sticking.

According to another aspect of the present invention, a printing system includes a printing apparatus and a computer. The printing apparatus includes a thermal head configured to print an image on a plurality of lines in a medium, and a processor. The computer is provided separately from the printing apparatus. The thermal head includes a plurality of heat-generating elements configured to generate heat when a voltage is applied thereto, and the thermal head is controlled to print on the plurality of lines in the medium in setting periods. The computer is configured to: determine, as a specific line, a $n^{th}$ line (n: an integer of 2 or greater) among the plurality of lines based on printing data for printing each of the plurality of lines, the $n^{th}$ line being a line estimated to have a possibility of sticking, and output specific line data for specifying the specific line, to the printing apparatus. The processor is configured to: set a second period within the setting period, the second period being a time period for adjusting a temperature change of the plurality of heat-generating elements of the thermal head without printing on the medium, and the second period being set to a timing after a first period, the first period being a time period for printing on the medium; set at least the $n^{th}$ line and a $(n-1)^{th}$ line is to be printed immediately before printing of the $n^{th}$ line, as a target line group, the $(n-1)^{th}$ line is to be printed immediately before printing of the $n^{th}$ line based on the printing data, so as to suppress the sticking.

According to another aspect of the present invention, a printing control method is a method of a printing apparatus. The printing apparatus includes a thermal head which is configured to print an image on a plurality of lines on a medium. The thermal head includes a plurality of heat-generating elements configured to generate heat when a voltage is applied thereto, and the thermal head is controlled to print on the plurality of lines in the medium in setting periods. The printing control method includes: setting a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium; determining a $n^{th}$ line (n: an integer of 2 or greater) among the plurality of lines in the medium based on printing data for printing the image, the $n^{th}$ line being a line estimated to have a possibility of sticking; and adjusting a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

According to another aspect of the present invention, a computer-readable recording medium has a printing control program for controlling a printing apparatus recorded therein. The printing apparatus includes a thermal head which is configured to print an image on a plurality of lines in a medium. The thermal head includes a plurality of heat-generating elements configured to generate heat when a voltage is applied thereto, and the thermal head is controlled to print on the plurality of lines in the medium in setting periods. The printing control program is configured to allow a computer: to set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium; to determine a $n^{th}$ line (n: an integer of 2 or greater) among the plurality of lines in the medium based on printing data for printing the image, the $n^{th}$ line being a line estimated to have a possibility of sticking; and to generate countermeasure data for adjusting a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

BRIEF DESCRIPTION OF THE SEVERAL VIEWS OF THE DRAWING

FIG. 7 illustrates a pattern setting method of countermeasure data.

FIG. 13 exemplifies an application time table.

DETAILED DESCRIPTION OF THE INVENTION

A printing apparatus in accordance with illustrative embodiments of the disclosure will be described in detail with reference to the drawings.

First Illustrative Embodiment

Figure 1:
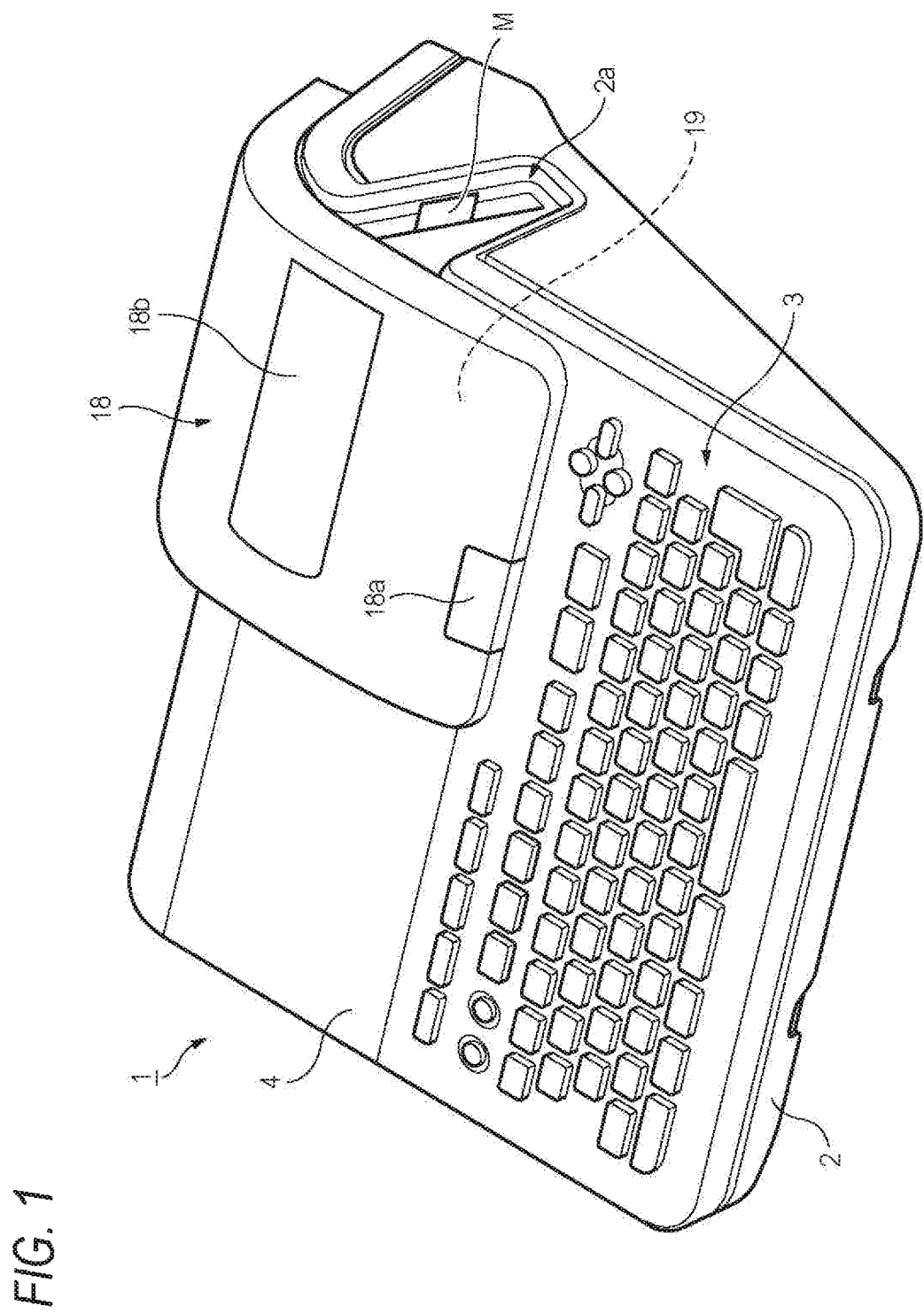
FIG. 1 is a perspective view of a printing apparatus 1.

FIG. 1 is a perspective view of a printing apparatus 1 in accordance with a first illustrative embodiment.

The printing apparatus 1 is a printing apparatus including a thermal head configured to perform printing on a medium to be printed. For example, the printing apparatus 1 is a label printer configured to perform printing on a long medium to be printed M in a single-path manner.

In the below, the label printer of a thermal transfer method using an ink ribbon will be exemplified. However, the printing method is not particularly limited. The printing method may be any printing method in which a sticking may occur. For example, the printing method may be a thermo-sensitive method using a heat-sensitive paper.

The medium to be printed M is a long tape member including a base material having an adhesive layer and a release paper releasably adhered to the base material so as to cover the adhesive layer. In the meantime, the medium to be printed M may be a tape member without release paper.

As shown in FIG. 1, the printing apparatus 1 includes an apparatus housing 2, an input unit 3, a display device 4, an opening and closing cover 18, and a cassette storage unit 19.

The input unit 3, the display device 4, and the opening and closing cover 18 are arranged on an upper surface of the apparatus housing 2.

Although not shown, the apparatus housing 2 is provided with a power supply cord connection terminal, an external device connection terminal, a storage medium insertion port, and the like.

The input unit 3 includes a variety of keys such as an input key, arrow keys, a conversion key, an enter key, and the like.

The display device 4 is a liquid crystal display panel, for example, and is configured to display letters corresponding to an input from the input unit 3, a selection menu for diverse setting, messages relating diverse processing, and the like. During the printing, a content (hereinafter, referred to as printing content) such as a letter, a figure and the like, which are instructed to be printed on the medium to be printed M, is displayed on the display device 4, and a progressing status of printing processing may be further displayed thereon.

In the meantime, the display device 4 may be provided with a touch panel unit. In this case, the display device 4 may be considered as a part of the input unit 3.

The opening and closing cover 18 is arranged to be openable and closable at an upper part of the cassette storage unit 19. The opening and closing cover 18 is opened when a button 18a is pushed.

The opening and closing cover 18 is provided with a window 18b so as to check whether a tape cassette 30 (refer to FIG. 2) is accommodated in the cassette storage unit 19 with naked eyes even at a state where the opening and closing cover 18 is closed.

A side surface of the apparatus housing 2 is formed with a discharge port 2a.

The medium to be printed M on which the printing has been performed in the printing apparatus 1 is discharged from the discharge port 2a to an outside of the apparatus.

Figure 2:
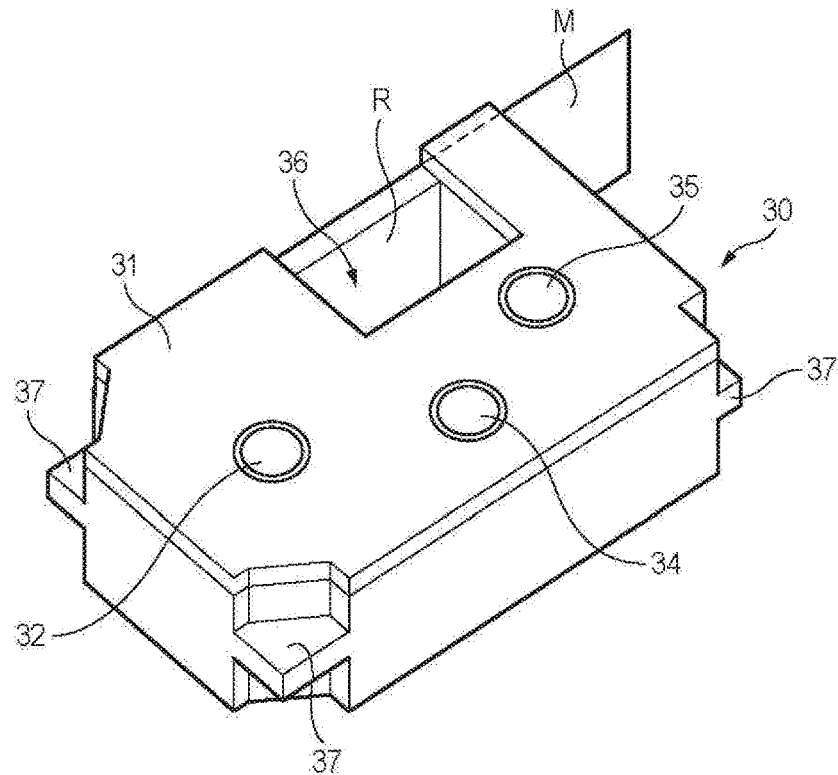
FIG. 2 is a perspective view of a tape cassette 30 that is to be accommodated in the printing apparatus 1.

FIG. 2 is a perspective view of a tape cassette 30 that is to be accommodated in the printing apparatus 1.

Figure 3:
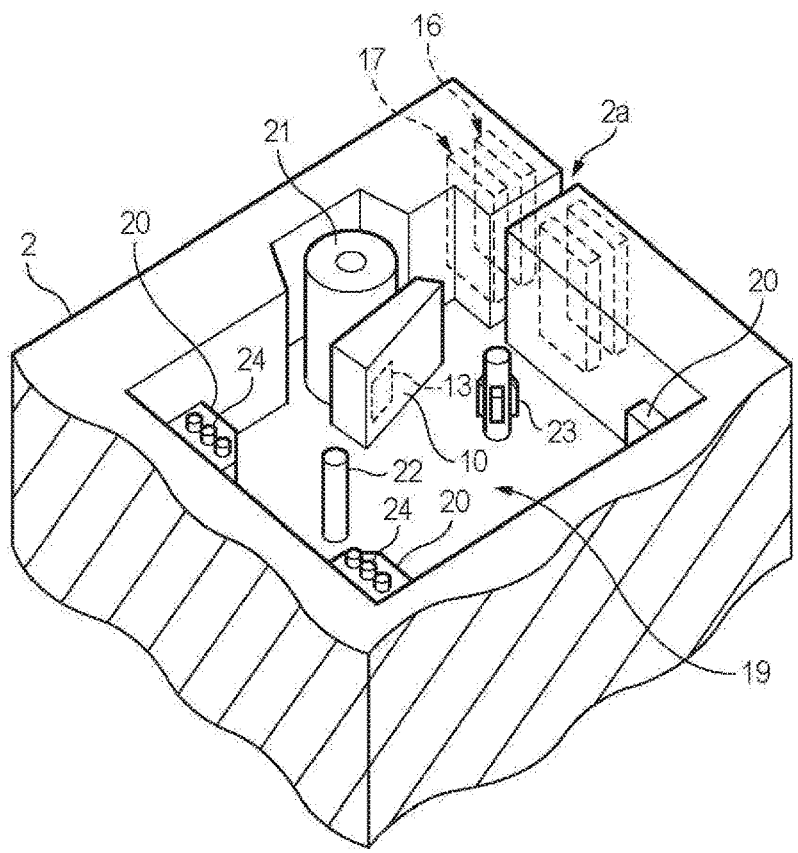
FIG. 3 is a perspective view of a cassette storage unit 19 of the printing apparatus 1.

FIG. 3 is a perspective view of the cassette storage unit 19 of the printing apparatus 1.

Figure 4:
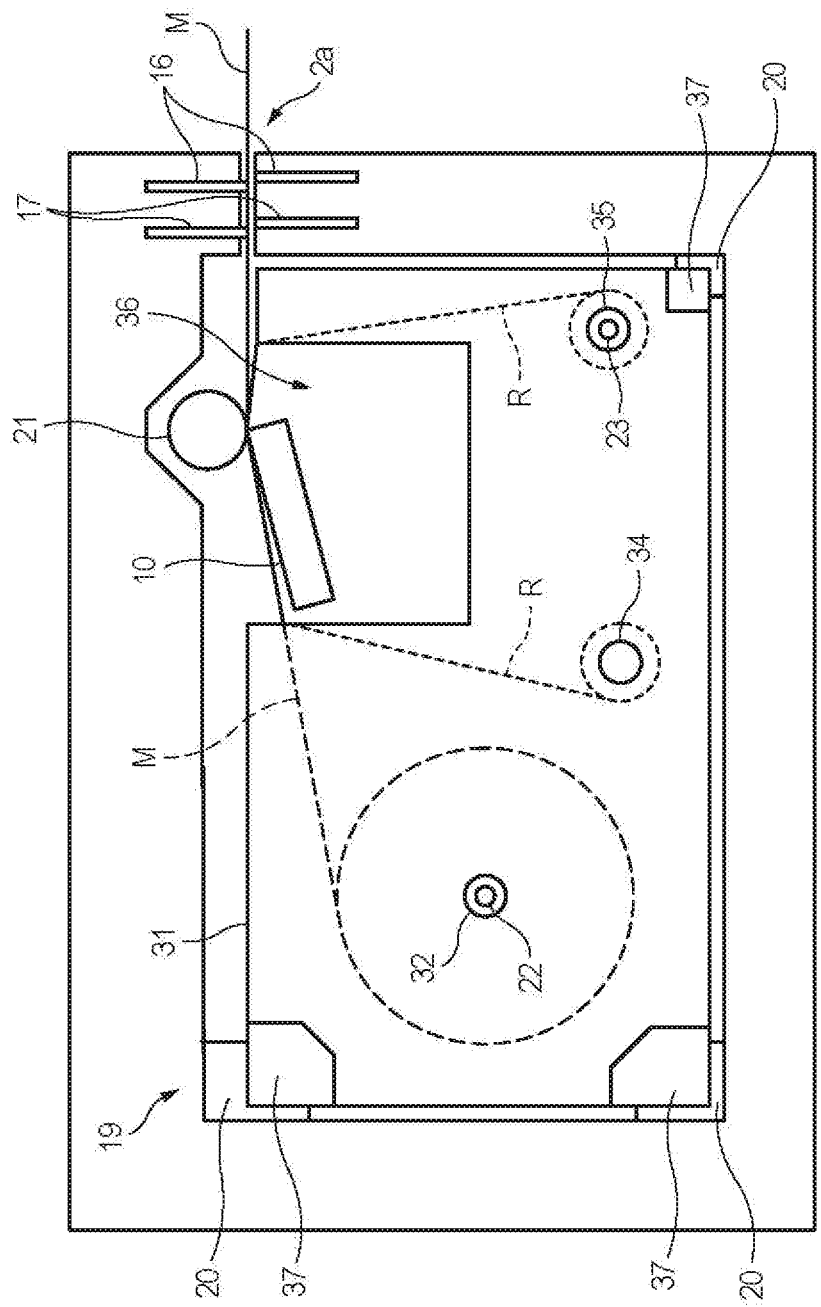
FIG. 4 is a sectional view of the printing apparatus 1.

FIG. 4 is a sectional view of the printing apparatus 1.

The tape cassette 30 shown in FIG. 2 is accommodated in the cassette storage unit 19 shown in FIG. 3 so as to be freely mounted and demounted.

FIG. 4 depicts a state where the tape cassette 30 is accommodated in the cassette storage unit 19.

As shown in FIG. 2, the tape cassette 30 has a cassette case 31 configured to accommodate therein the medium to be printed M and an ink ribbon R and formed with a thermal head insertion part 36 and engaging parts 37.

The cassette case 31 is provided with a tape core 32, an ink ribbon supply core 34, and an ink ribbon winding core 35.

The medium to be printed M is wound on the tape core 32 in the cassette case 31 in a roll shape.

The ink ribbon R for thermal transfer is wound on the ink ribbon supply core 34 within the cassette case 31 in a roll shape at a state where a tip end thereof is wound on the ink ribbon winding core 35.

As shown in FIG. 3, the cassette storage unit 19 of the apparatus housing 2 is provided with a plurality of cassette receiving parts 20 for supporting the tape cassette 30 at a predetermined position.

The cassette receiving part 20 is provided with a tape width detection switch 24 for detecting a width of a tape (medium to be printed M) to be accommodated in the tape cassette 30.

The tape width detection switch 24 is a detection unit configured to detect a width of the medium to be printed M based on a shape of the cassette.

The cassette storage unit 19 is further provided with a thermal head 10 having a plurality of heat-generating elements and configured to perform printing on the medium to be printed M, a platen roller 21, which is a conveyance unit configured to convey the medium to be printed M, a tape core engaging shaft 22, and an ink ribbon winding drive shaft 23.

In the thermal head 10, a thermistor 13 is embedded.

The thermistor 13 is a head temperature measuring unit configured to measure a temperature of the thermal head 10.

As shown in FIG. 4, at a state where the tape cassette 30 is accommodated in the cassette storage unit 19, the engaging parts 37 provided to the cassette case 31 are supported to the cassette receiving parts 20 provided to the cassette storage unit 19. Then, the thermal head 10 is inserted in the thermal head insertion part 36 formed in the cassette case 31.

The tape core engaging shaft 22 is engaged with the tape core 32 of the tape cassette 30. The ink ribbon winding drive shaft 23 is engaged with the ink ribbon winding core 35.

When a printing instruction is input to the printing apparatus 1, the medium to be printed M is supplied from the tape core 32 by rotation of the platen roller 21.

At this time, the ink ribbon winding drive shaft 23 is synchronously rotated with the platen roller 21, so that the ink ribbon R is supplied from the ink ribbon supply core 34 together with the medium to be printed M. Thereby, the medium to be printed M and the ink ribbon R are conveyed with being superimposed on each other.

When passing between the thermal head 10 and the platen roller 21, the ink ribbon R is heated by the thermal head 10, so that the ink is transferred to the medium to be printed M and the printing is thus performed.

The used ink ribbon R, which has passed between the thermal head 10 and the platen roller 21 and the ink thereof has been transferred to the medium to be printed M, is wound to the ink ribbon winding core 35.

In the meantime, the printed medium to be printed M having passed between the thermal head 10 and the platen roller 21 is cut by a half-cut device 16 and a full-cut device 17 and is then discharged from the discharge port 2a.

Figure 5:
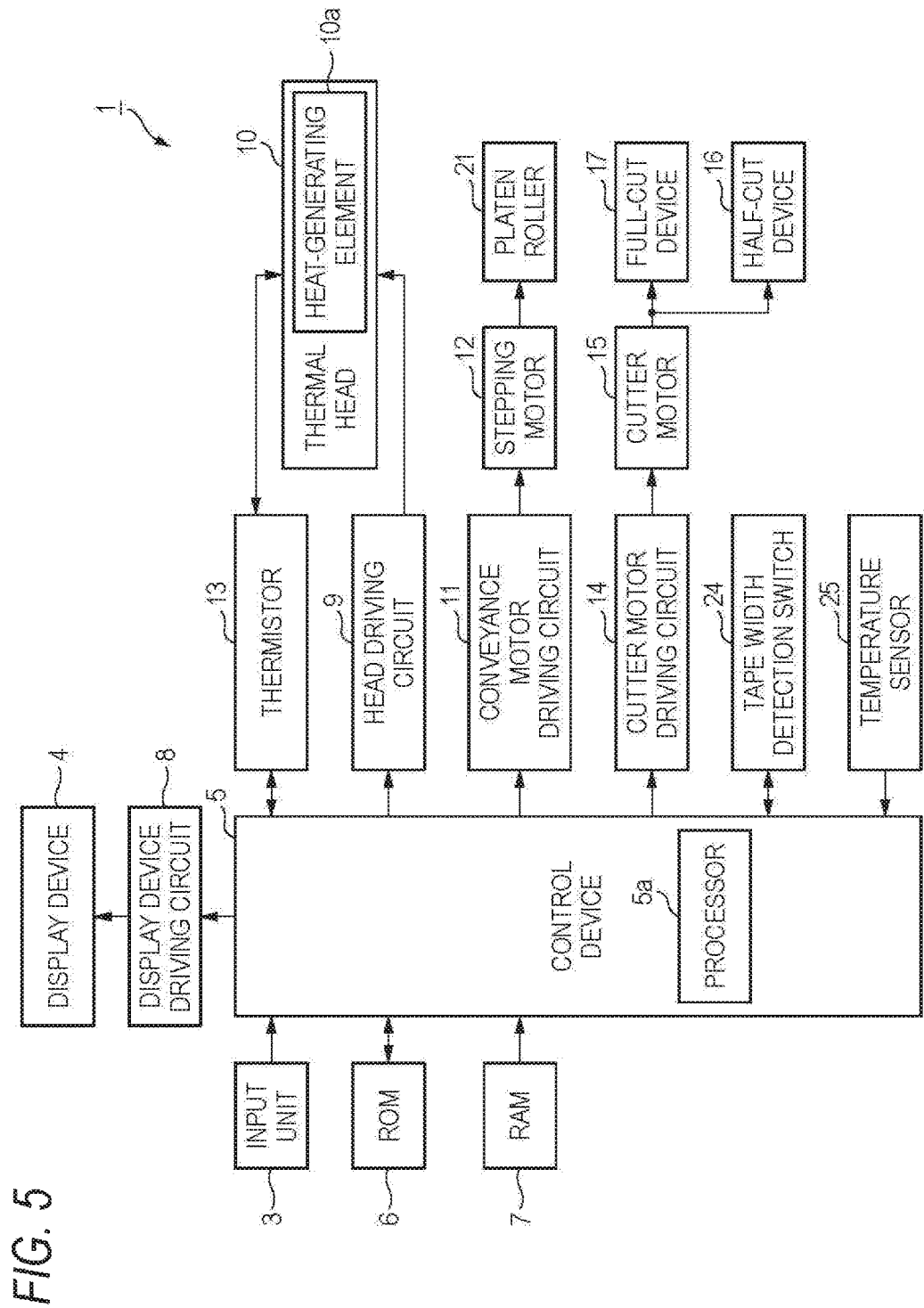
FIG. 5 is a block diagram depicting a hardware structure of the printing apparatus 1.

FIG. 5 is a block diagram depicting a hardware structure of the printing apparatus 1.

The printing apparatus 1 includes a control device 5, a ROM (Read Only Memory) 6, a RAM (Random Access Memory) 7, a display device driving circuit 8, a head driving circuit 9, a conveyance motor driving circuit 11, a stepping motor 12, a cutter motor driving circuit 14, a cutter motor 15, and a temperature sensor 25, in addition to the input unit 3, the display device 4, the thermal head 10, the thermistor 13, the half-cut device 16, the full-cut device 17, the platen roller 21, and the tape width detection switch 24.

In the meantime, at least the control device 5, the ROM 6 and the RAM 7 configure a computer of the printing apparatus 1.

The control device 5 includes a processor 5a such as a CPU (Central Processing Unit) and the like, for example. The control device 5 is configured to develop programs stored in the ROM 6 into the RAM 7 and to execute the same, thereby controlling operations of the respective units of the printing apparatus 1.

The control device 5 functions as an estimation unit configured to estimate a specific line having a relatively high possibility of occurrence of sticking, based on printing data.

In the meantime, the control device 5 functions as a data generation unit configured to generate countermeasure data for suppressing occurrence of sticking, too.

The control device 5 functions as a head control unit configured to generate a strobe signal, which is an example of the control signal for designating a first application control time period (a first period) for performing printing on the medium to be printed M and a second application control time period (a second period) for adjusting a temperature change of the thermal head 10 without performing printing on the medium to be printed M, too.

The control device 5 is configured to supply at least the strobe signal, the printing data and the countermeasure data to the head driving circuit 9, and to control the thermal head 10 via the head driving circuit 9.

The control device 5 functions as a conveyance control unit configured to control the platen roller 21.

Also, the control device 5 functions as a cut control unit configured to control a cut device.

In the meantime, the first application control time period is a time period for which application or non-application to a plurality of heat-generating elements 10a of the thermal head 10a is set in correspondence to printing data.

The second application control time period is a time period for which application or non-application to the plurality of heat-generating elements 10a of the thermal head 10a is set in correspondence to countermeasure data.

The second application control time period is a time period that is temporally spaced from the first application control time period, is a time period that is set as timing temporally later than the first application control time period with a non-application control time period, for which the plurality of heat-generating elements 10a of the thermal head 10 is not energized, being interposed therebetween, and is a time period temporally shorter than the first application control time period.

The second application control time period is a time period having time of about 30% to 50% of the first application control time period, and is time from 100 μsec to 200 μsec.

In the ROM 6, a printing program for performing the printing on the medium to be printed M, and a variety of data (for example, fonts, an application time table, and the like) necessary to execute the printing program are stored.

The ROM 6 functions as a storage medium in which a program, which can be read by the control device 5, is stored.

The RAM 7 includes a printing data storage part in which data (hereinafter, referred to as 'printing data') indicative of a pattern of printing content is stored.

Also, the RAM 7 includes a display data storage part in which display data is stored.

The display device driving circuit 8 is configured to control the display device 4, based on the display data stored in the RAM 7.

The display device 4 may display the printing content in such an aspect that a user can recognize a progressing status of printing processing, under control of the display device driving circuit 8, for example.

The head driving circuit 9 is a head driving unit configured to drive the thermal head 10, based on the strobe signal, which is a control signal to be supplied from the control device 5, the printing data and the countermeasure data.

More specifically, for a time period in which the strobe signal (control signal) is ON (hereinafter, referred to as 'application control time period'), the plurality of heat-generating elements 10a is energized or de-energized based on the printing data and the countermeasure data.

The thermal head 10 is a printing head having the plurality of heat-generating elements 10a aligned in a main scanning direction and configured to print on a plurality of lines in the medium to be printed M.

The head driving circuit 9 is configured to enable the heat-generating elements 10a corresponding to the printing data and the countermeasure data to generate heat and to heat the ink ribbon R by selectively applying a voltage to one of the heat-generating elements 10a of the thermal head 10, in correspondence to the printing data and the countermeasure data, for the application control time period of the strobe signal supplied from the control device 5. Thereby, the thermal head 10 performs the printing line by line on the medium to be printed M by the thermal transfer.

The conveyance motor driving circuit 11 is configured to drive the stepping motor 12.

The stepping motor 12 is configured to rotate the platen roller 21.

The platen roller 21 is a conveyance unit configured to rotate by power from the stepping motor 12 and to convey the medium to be printed M in a longitudinal direction (sub-scanning direction) of the medium to be printed M.

The cutter motor driving circuit 14 is configured to drive the cutter motor 15.

The half-cut device 16 and the full-cut device 17 are configured to operate by power from the cutter motor 15, thereby half-cutting or full-cutting the medium to be printed M.

The full cut is an operation of cutting the base material of the medium to be printed M together with the release paper along the width direction, and the half cut is an operation of cutting only the base material along the width direction.

The temperature sensor 25 is an environment temperature measuring unit configured to measure a temperature around the printing apparatus 1, as an environment temperature.

Figure 6:
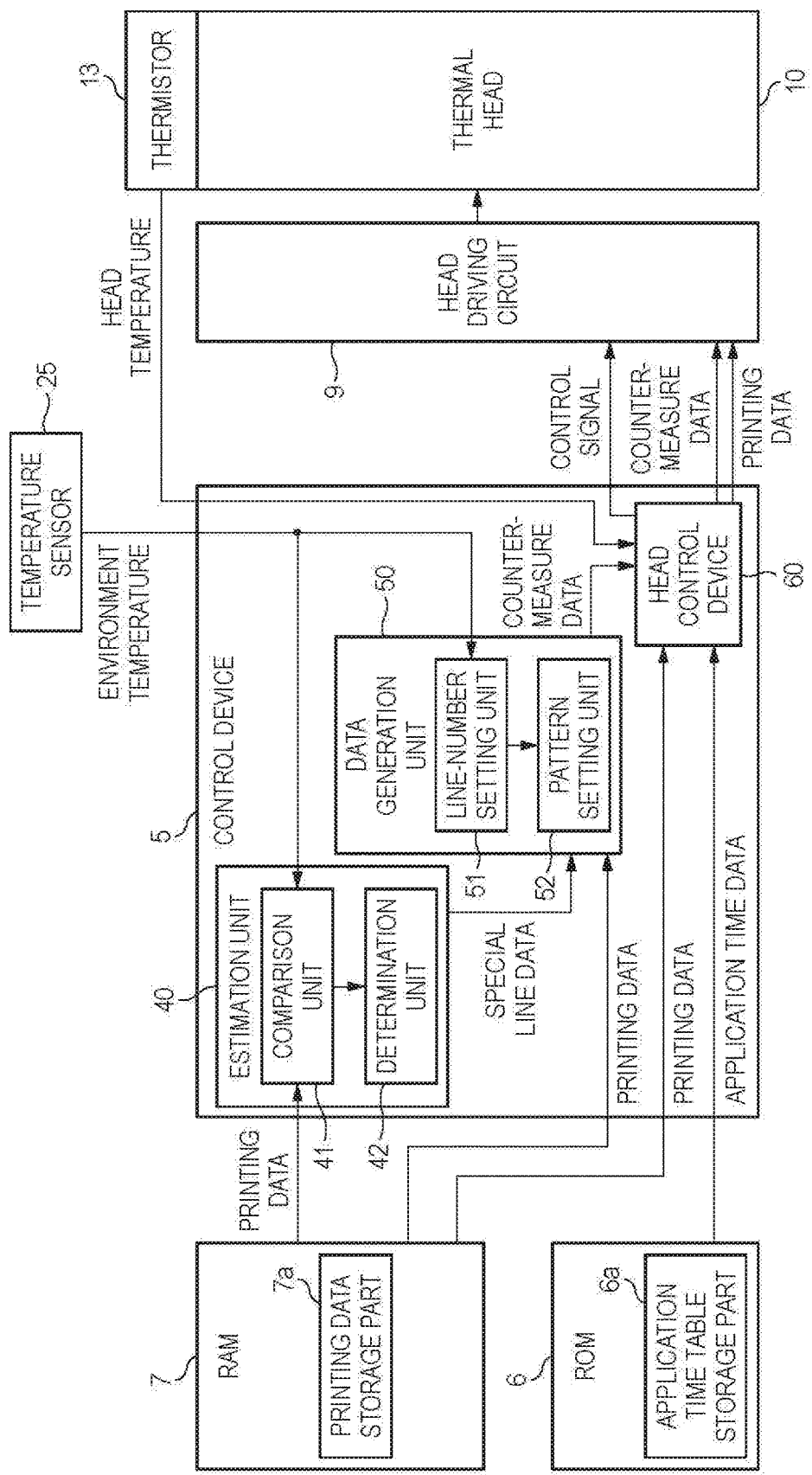
FIG. 6 is a block diagram depicting a functional structure of the printing apparatus 1.

FIG. 6 is a block diagram depicting a functional structure of the printing apparatus 1.

FIG. 6 mainly depicts a functional structure of the control device 5 included in the printing apparatus 1.

The control device 5 includes an estimation unit 40, a data generation unit 50, and a head control device 60.

The estimation unit 40 is configured to estimate, as a specific line ($n^{th}$ line: n is an integer of 2 or greater), a line having a relatively high possibility of occurrence of sticking, based on printing data including a plurality of printing line data corresponding to a plurality of lines to be printed by the thermal head 10 and provided so as to print on each of the plurality of lines by the thermal head 10.

The estimation unit 40 is configured to estimate the specific line having a relatively high possibility of occurrence of sticking by specifying a line having a possibility that a temperature of the thermal head 10 will rapidly decrease at the line, based on the printing data.

In the meantime, the printing data that is to be used by the estimation unit 40 is read out from a printing data storage part 7a of the RAM 7.

Herein, the specific line may be any line for which it is estimated that the sticking will occur, and the estimation unit may be configured to estimate, as the specific line, a line for which it is estimated that the sticking will occur.

More specifically, the estimation unit 40 includes a comparison unit 41, and a determination unit 42.

The comparison unit 41 is configured to compare two printing line data, which corresponds to two lines to be printed with being adjacent to each other, of the plurality of printing line data included in the printing data.

The determination unit 42 is configured to determine, as the specific line, a line having a relatively high possibility of occurrence of sticking, based on a comparison result of the comparison unit 41.

That is, the estimation unit 40 is configured to estimate the specific line that is estimated to have a relatively high possibility of occurrence of sticking, based on the comparison result of the two printing line data, which corresponds to two lines to be printed with being adjacent to each other.

The reason is that it is possible to expect a rapid temperature change, which will occur between two lines to be printed with being adjacent to each other, by comparing the two printing line data corresponding to two lines to be printed with being adjacent to each other.

The comparison unit 41 may be configured to compare a number of printing dots, which are specified based on one of two printing line data corresponding to two lines to be printed with being adjacent to each other and are set to be printed on the medium to be printed M by enabling the heat-generating elements 10a of the thermal head 10 to generate heat, and a number of printing dots, which are specified based on the other of two printing line data corresponding to two lines to be printed with being adjacent to each other, for example.

The reason is that it is possible to expect temperature lowering of the thermal head 10 by comparing the numbers of printing dots.

The comparison unit 41 may also be configured to compare a number of printing dot groups, which are printing dots specified based on one of two printing line data corresponding to two lines to be printed with being adjacent to each other and continuously aligned by a predetermined number, and a number of printing dot groups, which are specified based on the other of two printing line data corresponding to two lines to be printed with being adjacent to each other, for example.

When a plurality of printing dots is grouped, an influence on the temperature of the thermal head 10 may be increased, as compared to printing dots that are apart from each other. For this reason, it is possible to expect the temperature lowering of the thermal head 10 with higher precision by comparing the numbers of printing dot groups, each of which is a set of the plurality of printing dots.

The determination unit 42 may set a threshold value for a ratio of the numbers of printing dots or the numbers of printing dot groups or may set a threshold value for a decrease number of the number of printing dots or the number of printing dot groups, for example.

The determination unit 42 may determine that there is a relatively high possibility of occurrence of sticking, when the ratio or decrease number is equal to or greater than the threshold value.

In the meantime, the threshold value may be a preset value or may be a value that is set based on the environment temperature measured by the temperature sensor 25.

The lower the environment temperature, the sticking is generally more likely to occur. Therefore, when setting the threshold value based on the environment temperature, it is preferable to reduce the threshold value as the environment temperature is lower. Thereby, it is possible to further suppress the sticking.

The threshold value may also be set based on a width of the medium to be printed M detected by the tape width detection switch 24.

The estimation unit 40 is configured to output data (hereinafter, referred to as 'specific line data) for specifying the specific line to the data generation unit 50.

The data generation unit 50 is configured to generate countermeasure data for designating application or non-application to the plurality of heat-generating elements 10a for the second application control time period, based on the printing data and the specific line data generated at the estimation unit 40.

The countermeasure data includes a plurality of line data (hereinafter, the line data included in the countermeasure data is also referred to as countermeasure data so as to distinguish the same from the line data included in the printing data) corresponding to the plurality of printing line data included in the printing data.

The countermeasure data preferably includes the same number of countermeasure data as the plurality of printing line data included in the printing data.

In the printing apparatus 1, the heat-generating elements 10a are enabled to generate the heat based on the countermeasure data different from the printing data, for a time period in which a temperature lowering, which may highly cause the sticking, is expected. Thereby, the rapid temperature lowering of the thermal head 10 is suppressed, so that the occurrence of sticking is suppressed.

To this end, the data generation unit 50 is preferably configured to generate the countermeasure data based on at least the printing data so that for the second application control time period, a voltage is to be applied to at least a part of the plurality of heat-generating elements 10a at two or more lines to continue (hereinafter, referred to as 'target line group') including a preceding line ((n−1)$^{th}$ line), which is to be printed one line before the specific line (n$^{th}$ line), and at least one line, which is to be printed continuously from the preceding line after the preceding line is printed and includes the specific line.

The data generation unit 50 is more preferably configured to generate the countermeasure data so that for the second application control time period, a voltage is to be applied to at least a part of the plurality of heat-generating elements 10a at the preceding line ((n−)$^{th}$ line), the n$^{th}$ line and at least one line to be printed continuously from the n$^{th}$ line.

More specifically, the data generation unit 50 includes a line-number setting unit 51 and a pattern setting unit 52.

The line-number setting unit 51 is configured to set a number of lines, which are to be included in the target line group for which the voltage is to be applied to the heat-generating elements for the second application control time period by the countermeasure data.

More specifically, the line-number setting unit 51 is configured to set at least the preceding line and the specific line as the target line group, based on the printing data.

More preferably, the line-number setting unit 51 is configured to set the preceding line ((n−1)$^{th}$ line), the specific line (n$^{th}$ line) and at least one line to be printed continuously from the specific line, based on the printing data.

The pattern setting unit 52 is configured to set each pattern of the plurality of countermeasure data.

As described above, the number of lines, which are to be included in the target line group set by the line-number setting unit 51, is preferably plural.

The line-number setting unit 51 may be configured to set the number of lines to be included in the target line group, based on the environment temperature.

That is, the lower the environment temperature, the sticking is generally more likely to occur. Therefore, when setting the number of lines based on the environment temperature, it is preferable to increase the number of lines to be included in the target line group so as to suppress the rapid temperature lowering resulting from the lowering of the environment temperature, as the environment temperature becomes lower. Thereby, it is possible to suppress the sticking, irrespective of the situations in which the printing apparatus 1 is located.

On the other hand, in an environment where the environment temperature is relatively high, the sticking is difficult to occur.

For this reason, when the environment temperature is higher than a preset threshold value (for example, 40° C.), the predetermined number may be set to zero (0), i.e., the application control may not be performed for the second application control time period, or the number of lines to be included in the target line group may be set to one (1), i.e., the application control may be performed only for the second application control time period of the preceding line.

The line-number setting unit 51 may be configured to set the number of lines to be included in the target line group, based on the printing data.

For example, when the voltage is applied to the sufficient number of heat-generating elements 10a for the first application control time period at a line subsequent to the specific line, the temperature is not lowered at the line subsequent to the specific line and it can be thus determined that the application control can be omitted for the second application control time period.

Therefore, the line-number setting unit 51 may be configured to calculate how many lines (hereinafter, referred to as low-printing rate lines) having a number of printing dots equal to or lower than a threshold value are continuously aligned after the specific line based on the printing data, and to set the number of lines to be included in the target line group based on the calculated number of low-printing rate lines to continue.

The line-number setting unit 51 may be configured to set a number equal to smaller than the number of low-printing rate lines to continue, as the number of lines to be included in the target line group. For example, the line-number setting unit 51 may be configured to set the number of low-printing rate lines to continue, as the number of lines to be included in the target line group.

The line-number setting unit 51 may be configured to set the predetermined number, based on the environment temperature and the printing data. For example, the line-number setting unit 51 may be configured to set, as the predetermined number, a smaller predetermined number of a predetermined number based on the environment temperature and a predetermined number based on the printing data.

The pattern setting unit 52 may be configured to set a pattern of the countermeasure data of at least the preceding line, based on the printing line data of the specific line and the printing line data of the preceding line.

The pattern setting unit 52 may be configured to compare data, which corresponds to the same heat-generating element, of the two printing line data, and to generate data corresponding to each heat-generating element to be included in the countermeasure data, for example.

Figure 7:
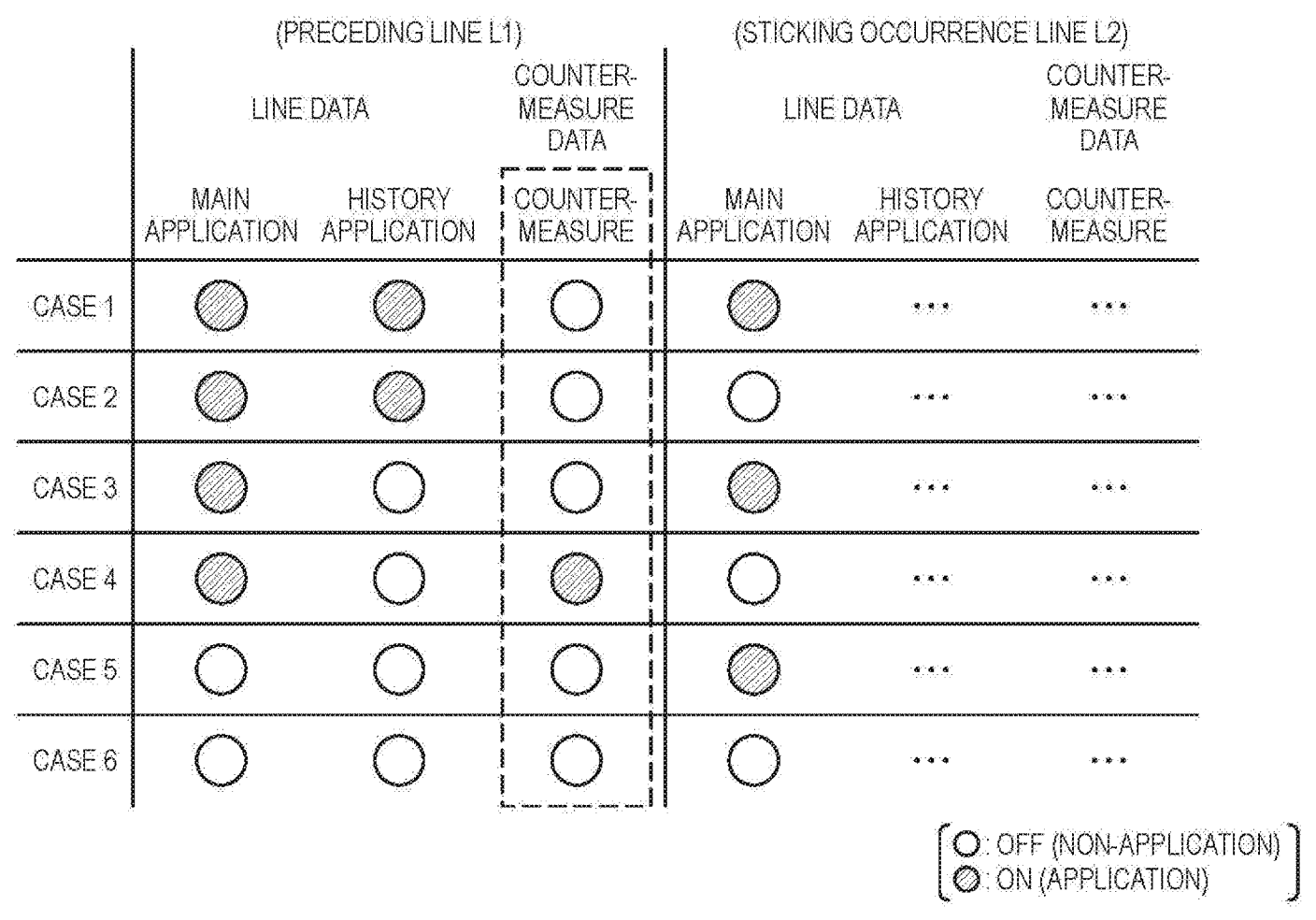

FIG. 7 illustrates a pattern setting method of the countermeasure data.

In the below, a specific example of the pattern setting method of the countermeasure data is described with reference to FIG. 7.

Herein, a case where a main application control time period, in which the application control is performed based on main application data, and a history application control time period, in which the application control is performed based on history application data, are provided to the first application control time period is described.

Meanwhile, in FIG. 7, the main application data, the history application data and the countermeasure data are shown with a black circle when the heat-generating elements 10*a* of the thermal head 10 are enabled to generate the heat (ON), and with a white circle when the heat-generating elements 10*a* are not enabled to generate the heat (OFF).

The main application data is a part of the printing data, and is printing data indicative of a printing pattern that is to be formed at a line (hereinafter, referred to as 'printing target line') of the medium to be printed M, on which the printing is to be performed for the first application control time period.

The history application data is a part of the printing data, is printing data that is to be generated based on printing data of a line (for example, a line spaced by one line before a target line) to be printed earlier than the printing target line, and is data for enabling printing dots to be appropriately printed by controlling the heat-generating elements 10*a* of the thermal head 10 to an appropriate temperature when printing the printing target line after the printing of the preceding line.

As shown in Case 4 of FIG. 7, when the main application data of the preceding line L1 is ON (black circle), the history application data of the preceding line L1 is OFF (white circle) and the main application data of the specific line L2 is ON (black circle) with respect to the heat-generating element 10*a* to be noticed, the pattern setting unit 52 may generate the countermeasure data of the preceding line, which is ON with respect to the heat-generating element 10*a* to be noticed.

The reason is described. If the application by the countermeasure data is not performed in Case 4, after the temperature of the heat-generating element 10*a* is increased by the application by the main application data, the application is not performed for a long time period of one line period (setting period) or longer and the temperature of the heat-generating element 10*a* is rapidly changed (lowered) from the high temperature to the low temperature, so that a possibility of occurrence of sticking relatively increases.

On the other hand, in other Cases (Cases 1 to 3 and Cases 5 and 6), the pattern setting unit 52 generates the countermeasure data of OFF (white circle).

The reason is described. In Cases 1 to 3, the non-application time period after the application at the preceding line L1 is assumed to be shorter than Case 4 and thus a possibility of occurrence of sticking is relatively low.

In Cases 5 and 6, since there is no temperature increase at the preceding line L1, the remarkable temperature lowering is not caused and thus a possibility of occurrence of sticking is relatively low.

In the meantime, the pattern setting method shown in FIG. 7 is an example of the method of setting a pattern of the countermeasure data of the preceding line. That is, the countermeasure data of the preceding line may be generated by the other setting methods.

The pattern setting unit 52 is configured to set a pattern of countermeasure data of a line except for the target line group to a pattern consisting of OFF.

Also, the pattern setting unit 52 may be configured to set a pattern of the countermeasure data for the target line group including the preceding line, to a pattern that is the same as the pattern of the countermeasure data of the preceding line.

The pattern setting unit 52 may be configured to set a pattern of the countermeasure data for a target line group without including the preceding line, to a pattern obtained by reversing the pattern of the main application data for each target line group.

The data generation unit 50 is configured to output the countermeasure data to the head control device 60.

The head control device 60 is configured to generate a strobe signal, which is a control signal for designating the first application control time period and the second application control time period, and to output the same to the head driving circuit 9.

More specifically, the head control device 60 is configured to calculate application times of the first application control time period and the second application control time period, based on the application time data read out from the application time table storage part 6*a* of the ROM 6 and the head temperature measured with the thermistor 13.

Then, the head control device 60 is configured to output the strobe signal (control signal) corresponding to the application times, the printing data (line data) and the countermeasure data (countermeasure data for each line) generated at the data generation unit 60 to the head driving circuit 9.

In the meantime, the application time is a temporal length of the application time period.

According to the printing apparatus 1 configured as described above, it is possible to suppress the rapid temperature lowering of the thermal head 10 by controlling the application to the plurality of heat-generating elements 10a for the second application control time period, based on the countermeasure data.

Therefore, it is possible to suppress the occurrence of sticking with the simple control. For this reason, it is possible to avoid deterioration of the printing quality, which is caused due to the sticking.

Figure 8:
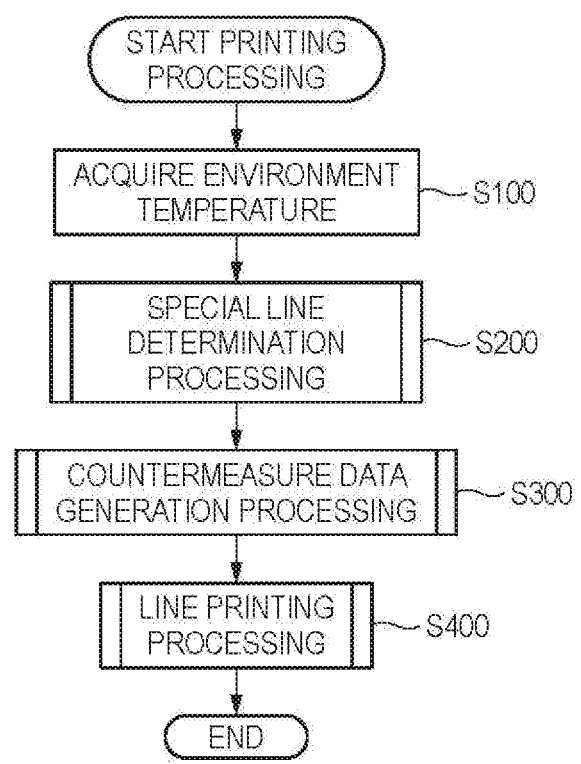
FIG. 8 is a flowchart of printing processing.

FIG. 8 is a flowchart of printing processing.

Figure 9:
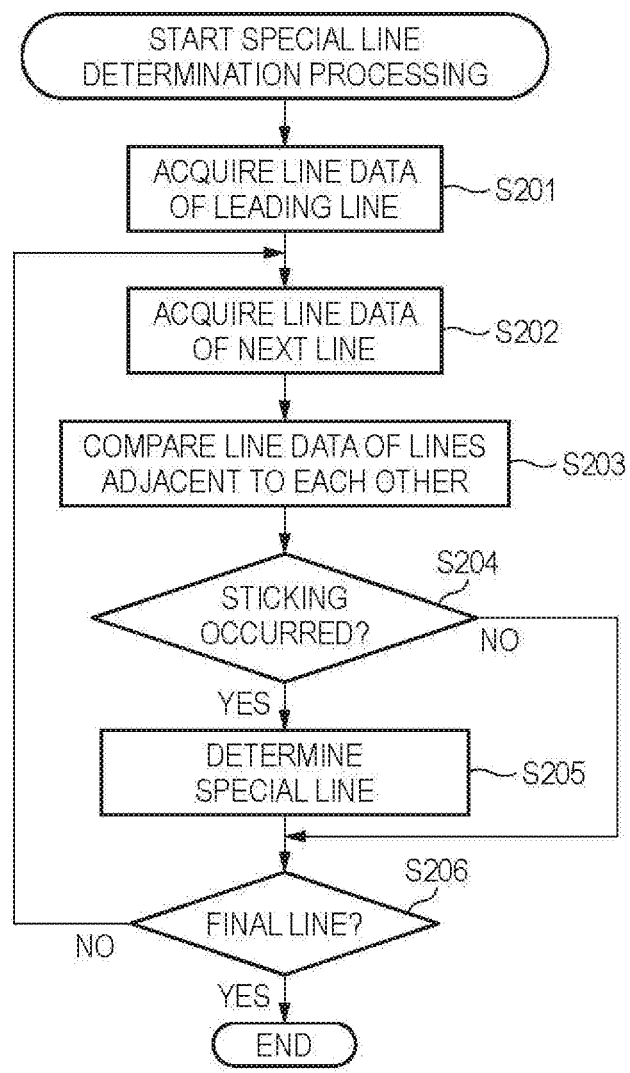
FIG. 9 is a flowchart of specific line determination processing.

FIG. 9 is a flowchart of specific line determination processing.

Figure 10A:
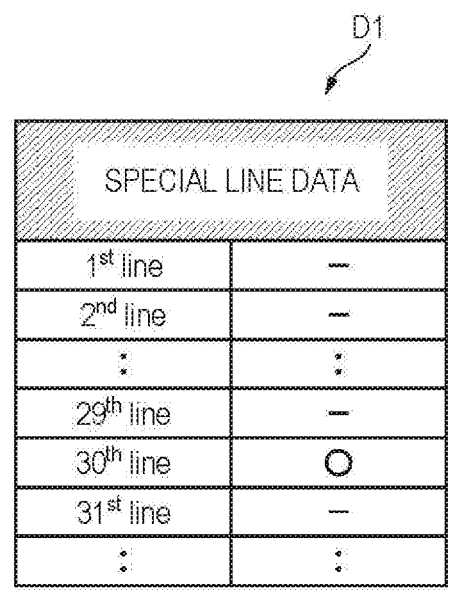
FIGS. 10A and 10B exemplify specific line data.
Figure 10B:
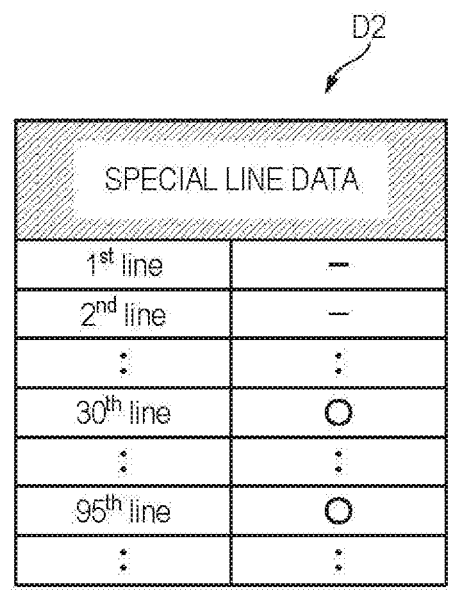

FIGS. 10A and 10B exemplify specific line data.

Figure 11:
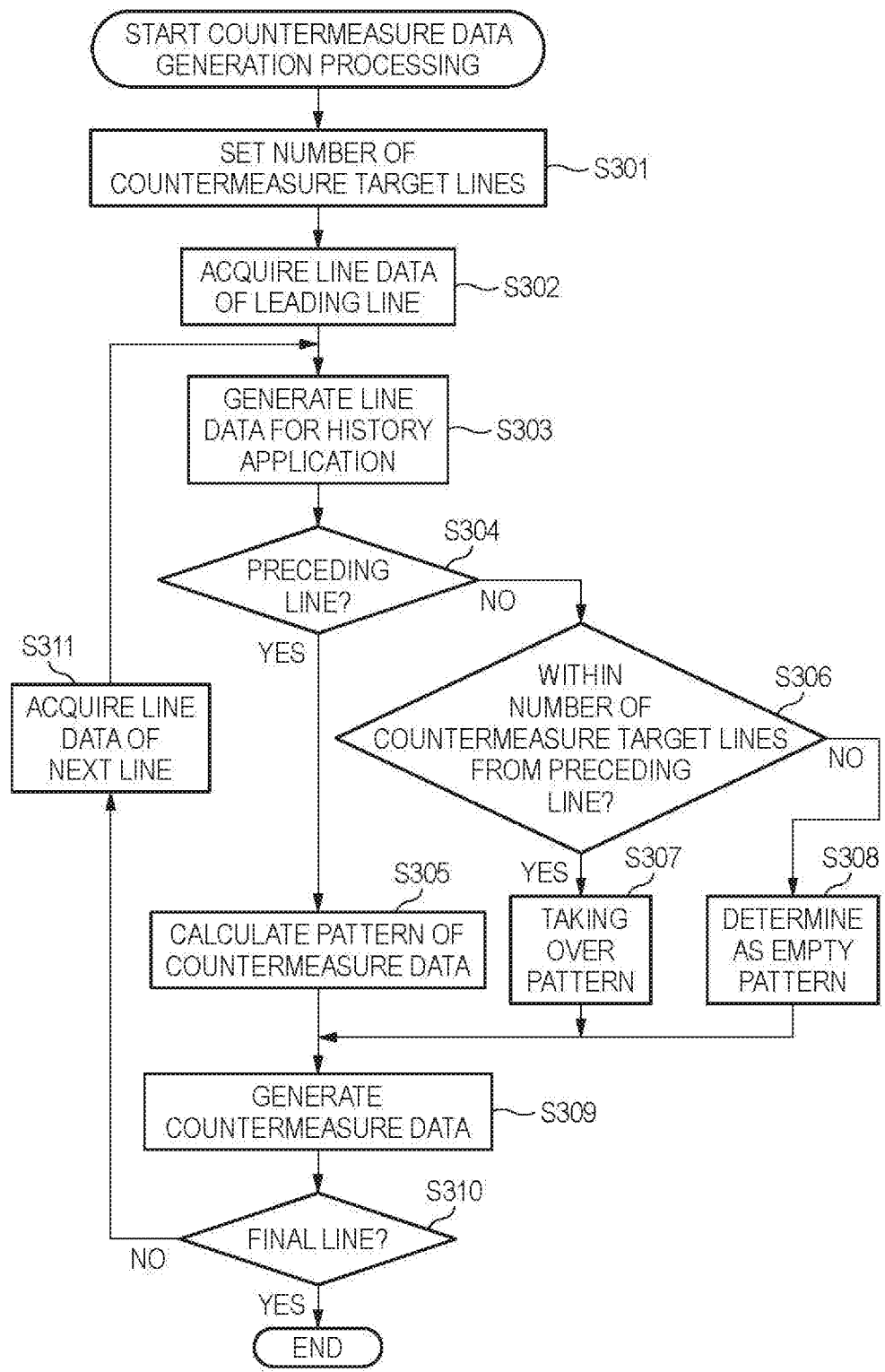
FIG. 11 is a flowchart of countermeasure data generation processing.

FIG. 11 is a flowchart of countermeasure data generation processing.

Figure 12:
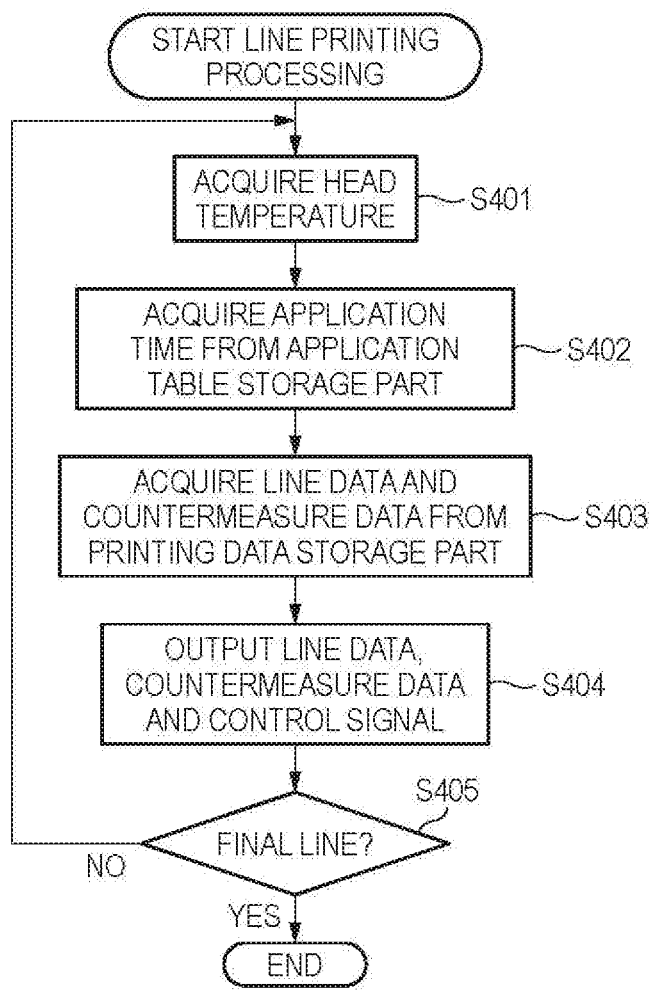
FIG. 12 is a flowchart of line printing processing.

FIG. 12 is a flowchart of line printing processing.

FIG. 13 exemplifies an application time table.

Figure 14:
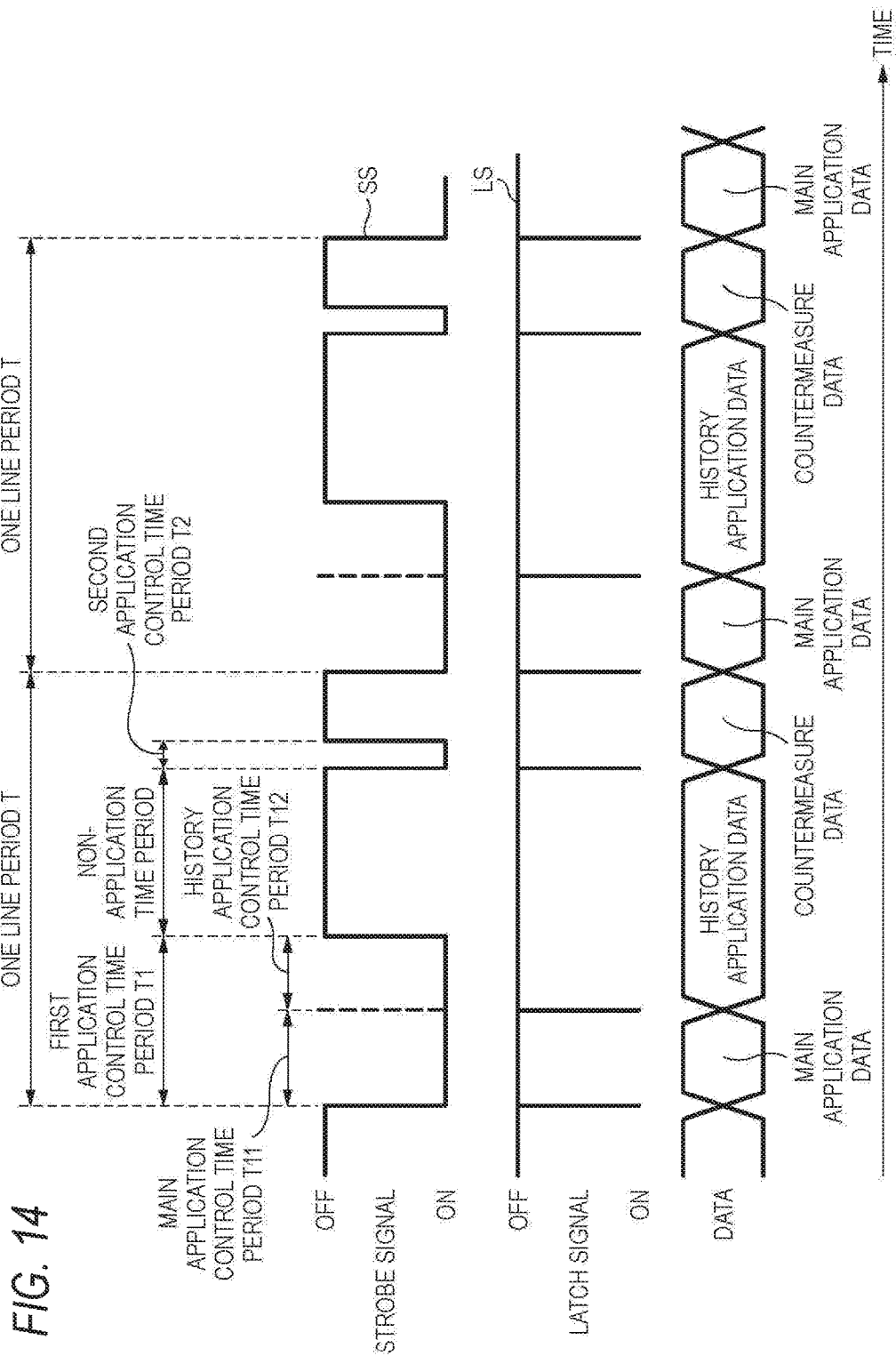
FIG. 14 illustrates a control signal.

FIG. 14 illustrates a control signal.

Figure 15:
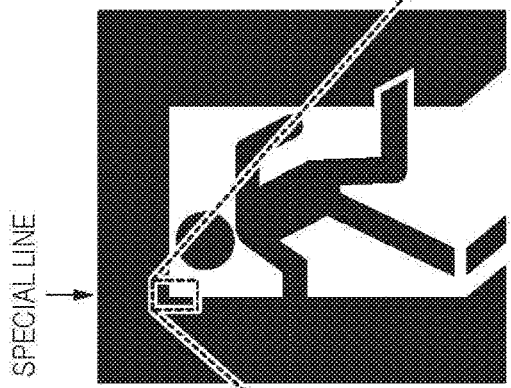
FIG. 15 depicts an example of a combination of printing data and countermeasure data.

FIG. 15 depicts an example of a combination of printing data and countermeasure data.

In the below, printing processing that is to be executed by the printing apparatus 1 is specifically described with reference to FIGS. 8 to 15.

When the printing data is input and the printing processing shown in FIG. 8 starts, the printing apparatus 1 first acquires the environment temperature around the printing apparatus 1 (step S100).

Herein, the control device 5 acquires data of the environment temperature that is output from the temperature sensor 25.

Then, the printing apparatus 1 executes specific line determination processing (step S200) shown in FIG. 9, countermeasure data generation processing (step S300) shown in FIG. 11, and line printing processing (step S400) shown in FIG. 12.

In the meantime, the specific line determination processing is performed by the estimation unit 40, the countermeasure data generation processing is performed by the data generation unit 50, and the line printing processing is performed by the head control device 60.

In the specific line determination processing, as shown in FIG. 9, the estimation unit 40 acquires line data of a leading line of the printing data and line data of a next line thereof (step S201, step S202).

Herein, the estimation unit 40 reads out the line data (line data for main application) of the leading line and the line data (line data for main application) of the next line from the RAM 7.

Thereafter, the estimation unit 40 compares two line data corresponding to two lines that are to be printed with being adjacent to each other (step S203).

Herein, the comparison unit 41 compares the line data of the next line acquired in step S202 and line data (hereinafter, referred to as 'pre-line data'. For example, the line data of the leading line acquired in step S201) of a line spaced by one line before the next line.

Specifically, for example, the estimation unit counts data "0xff", which indicates the printing dots to continue by 8 dots and included in each of the line data of the pre-line and the line data of the next line, and calculates a ratio thereof (the number of 0xff of the leading line/the number of 0xff of the next line).

Based on the comparison result, the comparison unit 40 determines whether the next line is the specific line (step S204).

Herein, the determination unit 42 determines whether a possibility of occurrence of sticking at the next line is relatively high, based on the comparison result of the line data of the pre-line and the line data of the next line.

Specifically, for example, when the ratio (the number of 0xff of the pre-line/the number of 0xff of the next line) calculated in step S203 is greater than 1.5, it is determined that a possibility of occurrence of sticking is relatively high, and when the ratio is equal to or smaller than 1.5, it is determined that the possibility of occurrence of sticking is relatively low.

When it is determined that the possibility of occurrence of sticking is relatively low, processing of step S205 is skipped.

On the other hand, when it is determined that the possibility of occurrence of sticking is relatively high, the estimation unit 40 determines the specific line (step S205).

Herein, the determination unit 42 determines the next line of which the line data has been acquired in step S202, as the specific line.

Thereafter, the estimation unit 40 determines whether the next line of which the line data has been acquired in step S202 is a final line, based on the printing data (step S206).

When it is determined that the next line is a final line, the estimation unit ends the specific line determination processing.

On the other hand, when it is determined that the next line is not a final line, the estimation unit repeats the processing of steps S202 to S206 until it is determined in step S206 that the next line is a final line.

By the above processing, the printing apparatus 1 (estimation unit 40) generates specific line data for specifying the specific line.

The specific line data D1 shown in FIG. 10A is an example of the specific line data that is generated when a $30^{th}$ line is estimated as the specific line.

The specific line data D2 shown in FIG. 10B is an example of the specific line data that is generated when a $30^{th}$ line and a $95^{th}$ line are estimated as the specific line.

When the specific line determination processing shown in FIG. 9 is over, the data generation unit 50 starts the countermeasure data generation processing shown in FIG. 11.

In the countermeasure data generation processing, the data generation unit 50 first sets the number of target lines, which is the number of lines (lines to be included in the target line group) at which a voltage is to be applied to the heat-generating elements continuously from the preceding line for the second application control time period (step S301).

Herein, the line-number setting unit 51 may set the number of target lines based on the environment temperature output from the temperature sensor 25 or may set the number of target lines based on the printing data read out from the printing data storage part 7a, for example.

Then, the data generation unit 50 acquires the line data of the leading line of the printing data (step S302).

Herein, the pattern setting unit 52 reads out the line data (line data for main application) of the leading line from the printing data storage part 7a, and sets the leading line, as a current line.

Thereafter, the data generation unit 50 generates line data for history application (step S303). Herein, the pattern setting unit 52 generates the line data for history application of the current line, based on the line data for main application acquired already, and stores the same in the printing data storage part 7a.

When the line data for history application is generated, the pattern setting unit 52 determines whether the current line is the preceding line, based on the specific line data (step S304).

The pattern setting unit 52 determines that the current line is the preceding line, when the specific line data is the data D1 shown in FIG. 10A and the current line is a 29$^{th}$ line.

When it is determined that the current line is the preceding line, the pattern setting unit 52 first reads line data (line data for main application) of the next line from the printing data storage part 7a, and sets a pattern of countermeasure data of the current line, based on the line data of the current line and the line data of the next line (step S305).

Then, the data generation unit 50 generates countermeasure data of the current line (step S309).

On the other hand, when it is determined that the current line is not the preceding line, the pattern setting unit 52 determines whether the current line is within the number of target lines set in step S301 from the preceding line (step S306).

When it is determined in step S306 that the current line is within the number of target lines, the pattern setting unit 52 takes over a pattern of countermeasure data of a line spaced by one line before the current line (step S307).

Then, the data generation unit 50 generates countermeasure data of the current line having the same pattern as the countermeasure data of the line spaced by one line before the current line (step S309).

When it is determined in step S306 that the current line is not within the number of target lines, the pattern setting unit 52 sets a pattern of the countermeasure data to an empty pattern consisting of OFF (step S308), and generates countermeasure data of the current line having the empty pattern (step S309).

When the countermeasure data is generated, the data generation unit 50 determines whether the current line is a final line (step S310).

When it is determined that the current line is a final line, the data generation unit 50 ends the countermeasure data generation processing.

On the other hand, when it is determined that the current line is not a final line, the data generation unit 50 reads out line data (line data for main application) of a next line from the printing data storage part 7a, and sets the read line, as a current line (step S311).

Then, the data generation unit 50 repeats the processing of steps S303 to S311 until it is determined in step S310 that the current line is a final line.

By the above processing, the countermeasure data including the same number of countermeasure data as the number of lines to be printed is generated.

When the countermeasure data generation processing shown in FIG. 11 is over, the head control device 60 starts the line printing processing shown in FIG. 12.

In the line printing processing, the head control device 60 first acquires data of the head temperature of the thermal head 10, which is output from the thermistor 13 (step S401).

Then, the head control device 60 acquires the application time from the application time table storage part 6a of the ROM 6 (step S402).

Herein, the head control device 60 refers to an application time table stored in the application time table storage part 6a and acquires the application time corresponding to the head temperature.

Specifically, the head control device 60 executes retrieval processing for an application time table TB1 shown in FIG. 13, for example, by using the head temperature acquired in step S401 as a key, and acquires main application time, history application time and countermeasure application time from a record corresponding to the head temperature.

When the application time is acquired, the head control device 60 acquires the line data (line data for main application and line data for history application) and countermeasure data from the printing data storage part 7a of the RAM 7 (step S403).

Then, the head control device 60 outputs the line data (line data for main application and line data for history application), the countermeasure data and the strobe signal (control signal) to the head driving circuit 9 (step S404).

Herein, the head control device 60 generates the strobe signal corresponding to the main application time, history application time and countermeasure application time acquired in step S402, and outputs the same to the head driving circuit 9. Thereby, the head driving circuit 9 drives the thermal head 10 based on the line data (line data for main application and line data for history application), the countermeasure data and the control signal (strobe signal), so that one line is printed on the medium to be printed M by the thermal head 10.

In the meantime, a strobe signal SS shown in FIG. 14 is an example of the strobe signal that is generated by the head control device 60.

The head control device 60 sets temporal lengths of the main application control time period T11, history application control time period T12 and second application control time period T2 of the strobe signal SS, in correspondence to the main application time, history application time and countermeasure application time acquired in step S402.

In other words, the head control device 60 sets the first application control time period T1 (the main application control time period T11 and the history application control time period T12) and the second application control time period T2 within one line period (setting period) for printing each line.

Finally, the head control device 60 determines whether the line of which the line data has been acquired in step S403 is a final line (step S405).

When it is determined that the line of which the line data has been acquired in step S403 is a final line, the head control device 60 ends the line printing processing. On the other hand, when it is determined that the line is not a final line, the head control device 60 repeats the processing of steps S401 to S405 until it is determined in step S405 that the line is a final line.

The printing apparatus 1 executes the printing processing shown in FIG. 8, so that it is possible to suppress the occurrence of sticking with the simple control.

In particular, as shown in FIG. 15, the countermeasure data is generated so that for the second application control time period, the voltage is to be applied to at least a part of the plurality of heat-generating elements 10 continuously from the preceding line spaced by one line before the specific line by the number of countermeasure target lines.

For this reason, since the voltage is applied for the second application control time period of at least the preceding line in the printing apparatus 1, it is possible to suppress the rapid temperature lowering at the specific line.

The above control that is to be executed by the printing apparatus 1 is effective even when it is expected that the temperature will be highly lowered after the specific line. In the printing apparatus 1, since the number of countermeasure target lines is appropriately set based on the environment temperature or the printing data, it is possible to alleviate the rapid temperature lowering at a line after the specific line. Therefore, it is possible to further suppress the occurrence of sticking.

In the printing apparatus 1, the pattern of countermeasure data at the preceding line is set based on the line data of the preceding line and specific line. For this reason, it is possible to set the pattern of specific data so as to suppress a situation where the gradation of printing dots is changed by the application control for the second application control time period at the preceding line at which the printing rate is relatively high and the temperature of the thermal head 10 increases. Therefore, it is possible to avoid the deterioration of the printing quality, which may be caused due to the sticking countermeasure, while suppressing the occurrence of sticking.

Meanwhile, in FIG. 15, the example where the pattern of the countermeasure data of the preceding line succeeds to the countermeasure data for the target line group without including the preceding line has been shown. However, the pattern of the countermeasure data may be set for each line included in the target line group.

Figure 16:
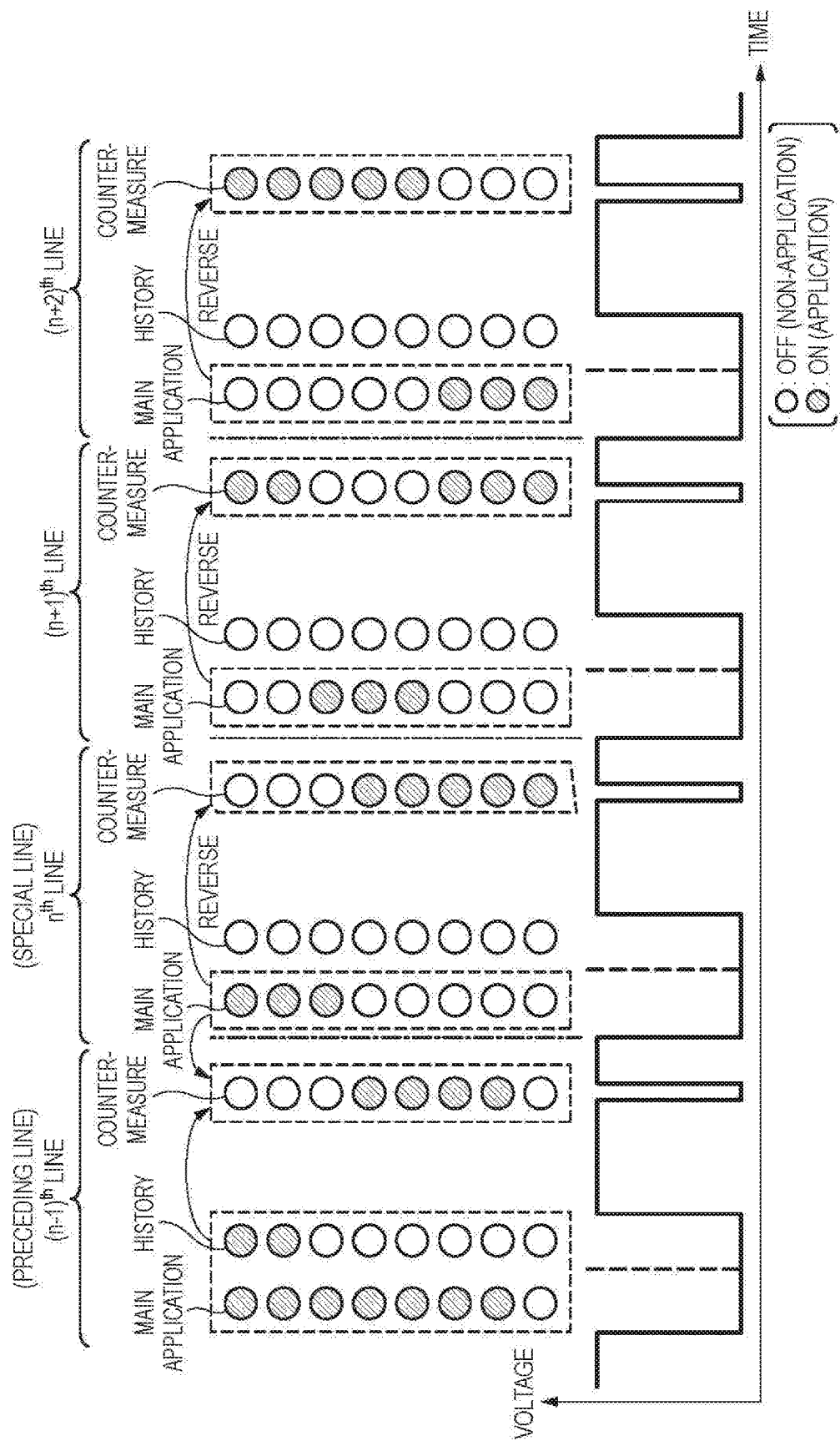
FIG. 16 depicts another example of the combination of the printing data and the countermeasure data.

For example, as shown in FIG. 16, the pattern of the countermeasure data for the target line group without including the preceding line may be a pattern obtained by reversing the main application data pattern of each target line.

The countermeasure data is generated in this pattern, so that it is possible to avoid a situation where the specific heat-generating element is excessively heated. Therefore, it is possible to avoid a situation where the printing gradation increases beyond the expected gradation.

The specific heat-generating element is heated by the countermeasure data, so that the temperature of the specific heat-generating element is changed, as compared to a case where the specific heat-generating element is not heated by the countermeasure data. Therefore, the pattern of the countermeasure data for each line included in the target linen group may be set, in consideration of the countermeasure data for at least an immediately-preceding line, too.

The specific line determination is performed for each line. However, a configuration is also possible in which after determining one specific line, the determination as to whether a line, which is not set as the target line group, is the preceding line may be performed without determining whether the current line is the preceding line for the set target line group.

Second Illustrative Embodiment

A printing apparatus of a second illustrative embodiment is similar to the printing apparatus 1, except that variable division printing of printing each line by the number of printing times set for each line is executed.

For this reason, the same constitutional elements as those of the printing apparatus 1 are denoted with the same reference numerals as the constitutional elements of the printing apparatus 1.

When all of the plurality of heat-generating elements 10a of the thermal head 10 is energized at one time, the current having a relatively large current value flows to the thermal head 10, so that a current capacity of a power supply circuit for supplying the current may be insufficient.

Therefore, in the printing apparatus of the second illustrative embodiment, when the number of heat-generating elements 10a, which are to be energized upon the printing of one line, is larger than a specific number, i.e., when printing one line having the number of printing dots larger than the specific number on the medium to be printed M, the control device 5 performs the control so that the printing is divided into multiple times and is executed in a time division manner.

Specifically, the plurality of heat-generating elements 10a is divided into a plurality of groups, and the application of the heat-generating elements 10a is performed at different times for each group. Thereby, it is possible to avoid the situation where the current capacity of the power supply circuit becomes insufficient.

Figure 17:
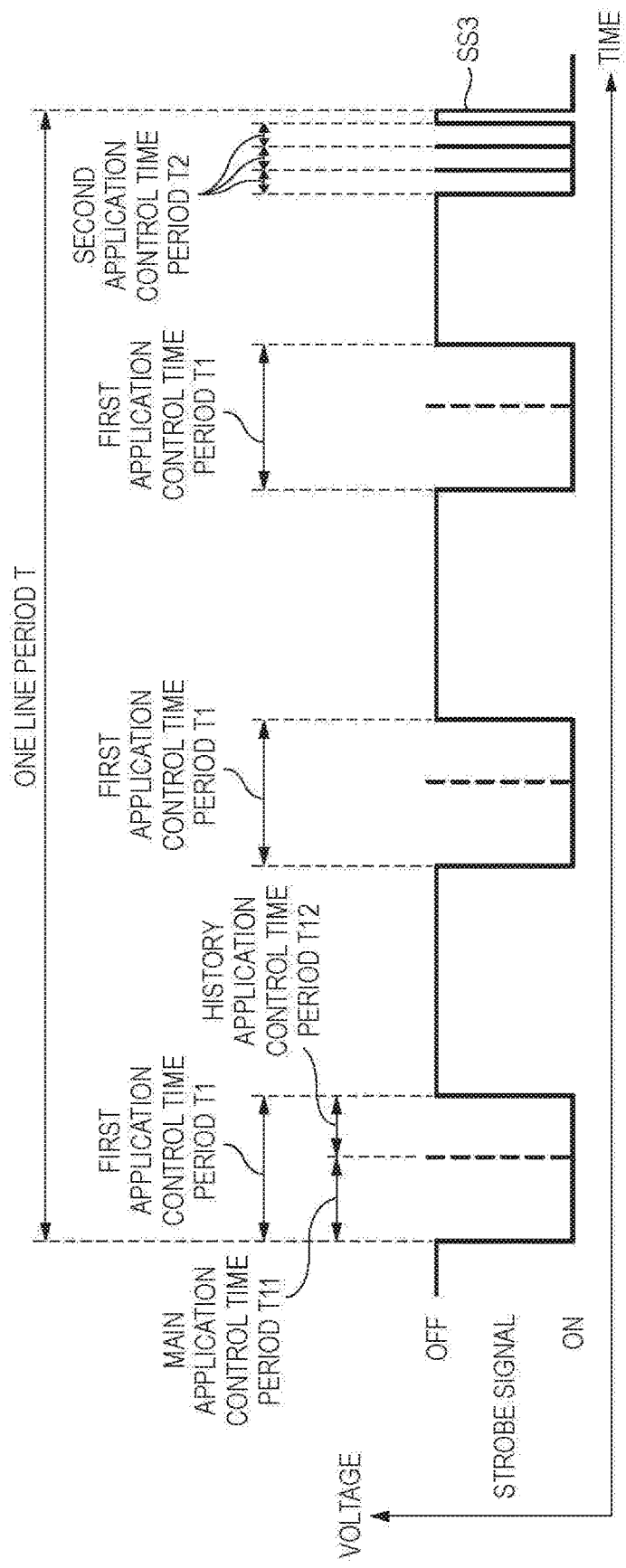
FIG. 17 illustrates a control signal upon division printing.

FIG. 17 illustrates a control signal upon division printing.

In the meantime, the division printing is a printing method of dividing printing of one line into multiple times and performing the printing in a time division manner. In contrast, a method of printing one line at one time is referred to as 'batch printing'.

In FIG. 17, a strobe signal SS3 (control signal) that is to be output when dividing and printing one line into three times is exemplified.

As shown in FIG. 17, when performing the division printing, the head control device 60 generates a strobe signal for designating a plurality of first application control time periods T1 and a plurality of second application control time periods T2 corresponding to the plurality of first application control time periods T1 within a time period of one line period T.

The plurality of first application control time periods T1 is time periods in which the different heat-generating elements 10a are energized or de-energized, respectively, and is temporally spaced from each other within the time period of one line period T.

The plurality of second application control time periods T2 is time periods in which the application of the same heat-generating elements 10a as the corresponding first application control periods T1 is controlled.

The plurality of second application control time periods T2 is provided at times spaced from each other and temporally later than the plurality of first application control time periods T1 with a non-application time period, in which the application to the heat-generating elements 10a of the thermal head 10 is not performed, being interposed therebetween, within the time period of one line period T.

In this case, since the plurality of second application control time periods T2 is collectively provided, it is possible to suppress an increase of design difficulty, which is caused when the plurality of second application control time periods is provided.

In particularly, the plurality of second application control time periods T2 is preferably provided within a time period closer to a commencement of a time period of next one line period T than a termination of a final first application control time period T1 within the time period of one line period T.

Figure 18:
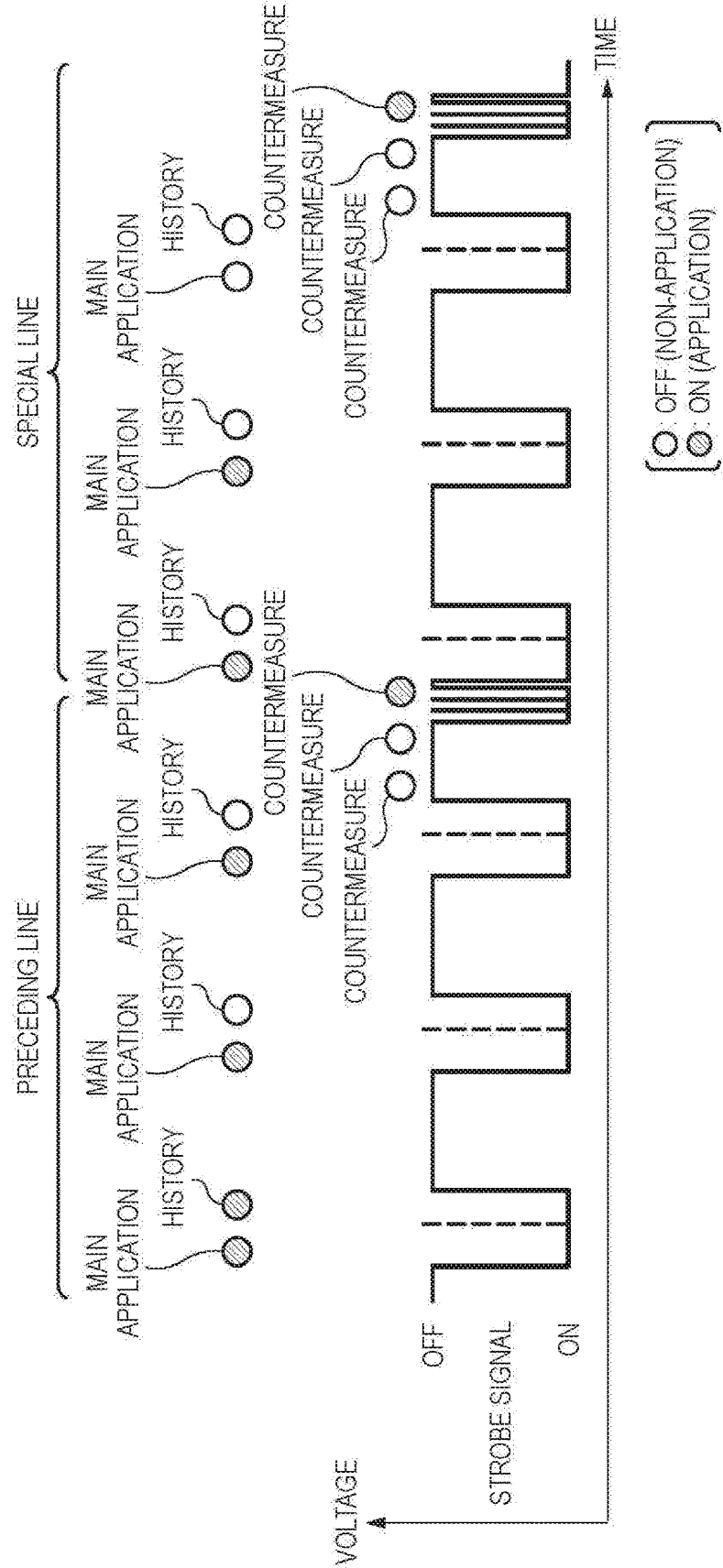
FIG. 18 depicts an example of the combination of the printing data and the countermeasure data upon the division printing.

FIG. 18 depicts an example of a combination of the printing data and the countermeasure data upon the division printing.

Even when the division printing is performed, the method of generating the countermeasure data is the same as the case where the batch printing is performed.

That is, the data generation unit 50 can generate the countermeasure data without distinguishing a line at which the division printing is to be performed and a line at which the batch printing is to be performed.

Like this, also in the printing apparatus of the second illustrative embodiment where the variable division printing is performed, it is possible to suppress the occurrence of sticking with the simple control.

When performing the division printing, since one line period is longer, as compared to the batch printing, the rapid temperature lowering of the thermal head is likely to occur, so that the sticking is likely to occur.

However, according to the printing apparatus of the second illustrative embodiment, it is possible to suppress the occurrence of sticking even when the division printing in which the sticking is likely to occur is performed.

Third Illustrative Embodiment

Figure 19:
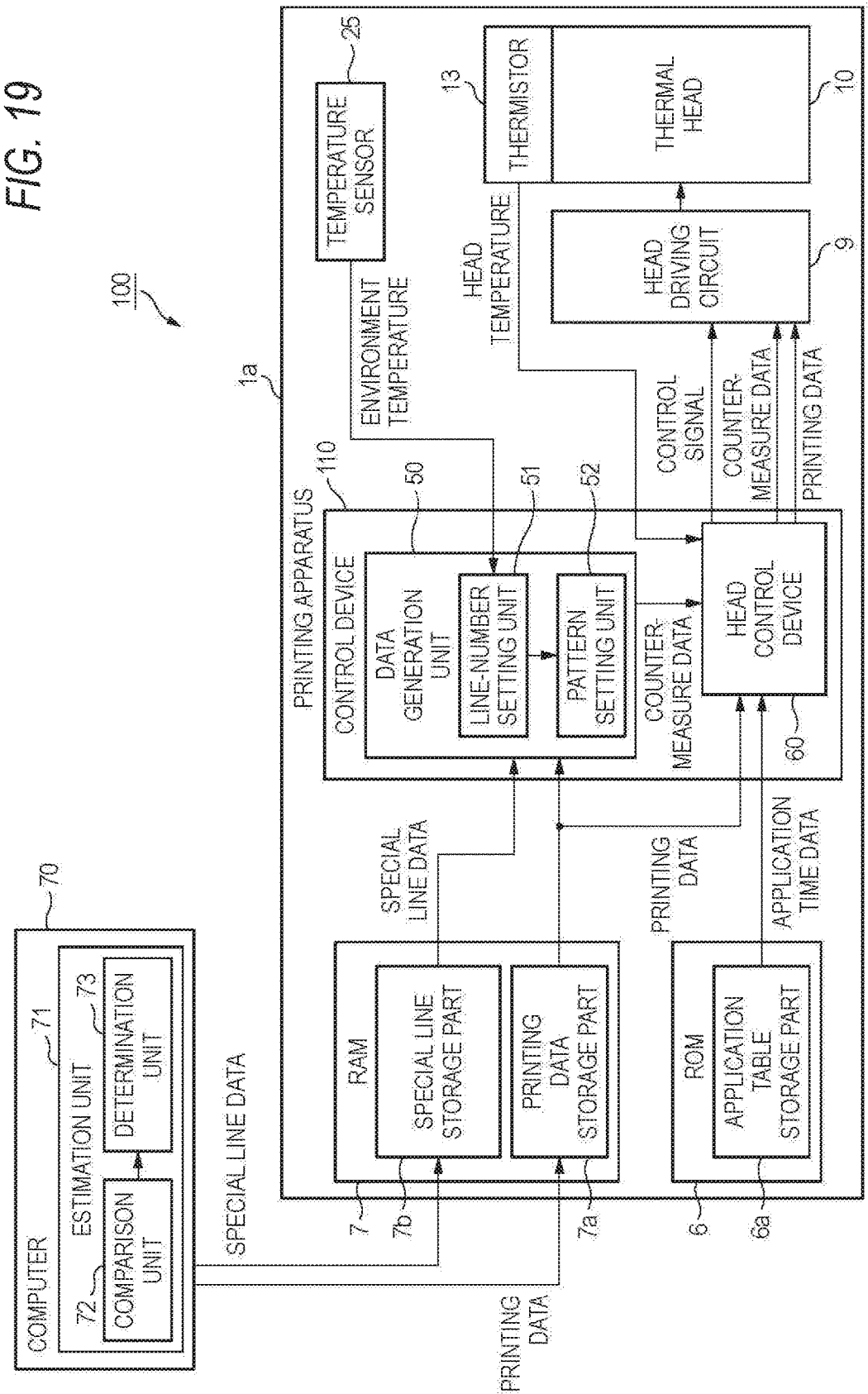
FIG. 19 exemplifies a hardware structure of a printing system 100.

FIG. 19 exemplifies a hardware structure of a printing system 100 in accordance with a third illustrative embodiment.

The printing system 100 includes a computer 70, and a printing apparatus 1a.

The computer 70 is provided separately from the printing apparatus 1a, and can exchange information with the printing apparatus 1a. For example, the computer 70 is a standard computer, and includes a processor, a memory, a storage and the like.

The printing system 100 is different from the printing apparatus 1, in that some processing of the printing apparatus 1 in accordance with the first illustrative embodiment is executed by the computer 70.

The computer 70 has an estimation unit 71 configured to function similarly to the estimation unit 40 of the printing apparatus 1 as the processor executes a program.

The estimation unit 71 has a comparison unit 72 configured to function similarly to the comparison unit 41 of the printing apparatus 1, and a determination unit 73 configured to function similarly to the determination unit 42. That is, the computer 70 is configured to estimate the specific line based on the printing data and to output the specific line data to the printing apparatus 1a.

The printing apparatus 1a is different from the printing apparatus 1, in that it has a control device 110, instead of the control device 5.

The control device 110 has the data generation unit 50 and the head control device 60 but does not have the estimation unit 40.

For this reason, the data generation unit 50 of the printing apparatus 1a is configured to read out the specific line data, which is output from the computer 70 and is stored in the specific line storage part 7b, and to generate the countermeasure data.

Also in the printing system 100 of the third illustrative embodiment, it is possible to suppress the occurrence of sticking by the simple control, like the printing apparatus 1.

The above illustrative embodiments are specific examples for easily understanding the disclosure, and the disclosure is not limited thereto. The printing apparatus, the printing system, the printing control method, and the program can be diversely modified and changed without departing from the claims.

What is claimed is:

1. A printing apparatus comprising:
a thermal head that is configured to print an image on a plurality of lines in a medium, and
a processor,
wherein the thermal head includes a plurality of heat-generating elements configured to generate heat when a voltage is applied thereto, and the thermal head is controlled to print on the plurality of lines in the medium in setting periods, and
wherein the processor is configured to:
set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium,
determine a $n^{th}$ line (n: an integer of 2 or greater) among the plurality of lines in the medium based on printing data for printing the image, the $n^{th}$ line being a line estimated to have a possibility of sticking in printing on the medium by the thermal head, and
adjust a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

2. The printing apparatus according to claim 1, wherein the processor is configured to:
generate countermeasure data for adjusting the temperature change of at least a part of the plurality of heat-generating elements based on the printing data so as to suppress the sticking in the printing on at least at the $n^{th}$ line in the second periods, and
execute the determination of the $n^{th}$ line, and the generation of the countermeasure data, before executing the printing.

3. The printing apparatus according to claim 1, wherein the printing data includes each piece of printing line data for printing on each of the plurality of lines, and
wherein the processor is configured to:
generate the countermeasure data, based on at least the printing line data corresponding to the printing on the $(n-1)^{th}$ line and the printing line data corresponding to the printing on the $n^{th}$ line, and
set the heat-generating elements at each line in the target line group to be applied by a voltage in the second periods to be same.

4. The printing apparatus according to claim 1, wherein the printing data includes each piece of printing line data for printing on each of the plurality of lines, and
wherein the processor is configured to:
generate the countermeasure data for setting the heat-generating elements to be applied by a voltage in the second period in the printing on the $(n-1)^{th}$ line, based on at least the printing line data corresponding to the printing on the $(n-1)^{th}$ line and the printing line data corresponding to the printing on the $n^{th}$ line, and
generate the countermeasure data for setting the heat-generating elements to be applied by a voltage in the second period in the printing on the target line group other than the $(n-1)^{th}$ line, based on the printing line data corresponding to the printing on each line in the target line group other than at least the $(n-1)^{th}$ line.

5. The printing apparatus according to claim 1, further comprising:
an environment temperature measuring unit that is configured to measure a temperature around the printing apparatus, as an environment temperature,
wherein the processor is configured to:
set, as the target line group, the $(n-1)^{th}$ line, the $n^{th}$ line, and at least one line which is printed continuously from the $n^{th}$ line and which includes a $(n+1)^{th}$ line, among the plurality of lines, and
set the number of the lines in the target line group, based on the environment temperature.

6. The printing apparatus according to claim 4, wherein the processor is configured not to estimate a possibility of the occurrence of sticking for at least one line which is printed continuously from the $n^{th}$ line and which includes a $(n+1)^{th}$ line in the target line group.

7. The printing apparatus according to claim 1, wherein the processor is configured to:
set, as the target line group, the $(n-1)^{th}$ line, the $n^{th}$ line, and at least one line which is printed continuously from the $n^{th}$ line and which includes a $(n+1)^{th}$ line, among the plurality of lines, and
set the number of the lines to be included in the target line group, based on the printing data.

8. The printing apparatus according to claim 7, wherein the processor is configured not to estimate a possibility of the occurrence of sticking for the at least one line which is printed continuously from the $n^{th}$ line and which includes the $(n+1)^{th}$ line in the target line group.

9. The printing apparatus according to claim 1, wherein the printing data includes each piece of printing line data for printing each line, and
wherein the processor is configured to:
compare two pieces of printing line data corresponding to two lines, which are to be printed with being adjacent to each other, among the plurality of lines, and
determine the $n^{th}$ line, as a specific line where the occurrence of the sticking is estimated, based on a result of the comparison.

10. The printing apparatus according to claim 9, wherein the processor is configured to:
compare the number of first printing dots to the number of second printing dots,
wherein the first printing dots are to be specified based on one of the two pieces of printing line data and are set to be printed on the medium, and
the second printing dots are to be specified based on the other of the two pieces of printing line data and are set to be printed on the medium, and
determine the specific line, based on a result of the comparison.

11. The printing apparatus according to claim 9, wherein the processor is configured to:
compare the number of first printing dot groups to the number of second printing dot groups,
wherein the first printing dots are specified based on one of the two pieces of printing line data and are set to be printed on the medium, and the first printing dot group is a group in which the first printing dots are continuously aligned by a preset number, and
the second printing dots are specified based on the other of the two pieces of printing line data and are set to be printed on the medium, and the second printing dot group is a group in which the second printing dots are continuously aligned by a preset number, and
determine the specific line, based on a result of the comparison.

12. A printing apparatus comprising:
a thermal head that is configured to print an image on a plurality of lines on a medium, and
a processor,
wherein the thermal head includes a plurality of heat-generating elements configured to generate heat when a voltage is applied thereto, and the thermal head is controlled to print on the plurality of lines in the medium in setting periods, and
wherein the processor is configured to:
set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium,
adjust a temperature change of at least a part of the plurality of heat-generating elements in the second periods corresponding to at least a $n^{th}$ line (n: an integer of 2 or greater) being a line estimated to have a possibility of sticking and a $(n-1)^{th}$ line as a target line group, the $(n-1)^{th}$ line is to be printed immediately before printing of the $n^{th}$ line, so as to suppress the sticking.

13. A printing system comprising:
a printing apparatus that includes a thermal head configured to print an image on a plurality of lines in a medium, and a processor, and
a computer that is provided separately from the printing apparatus,
wherein the thermal head includes a plurality of heat-generating elements configured to generate heat when a voltage is applied thereto, and the thermal head is controlled to print on the plurality of lines in the medium in setting periods,
wherein the computer is configured to:
determine, as a specific line, a $n^{th}$ line (n: an integer of 2 or greater) among the plurality of lines based on printing data for printing each of the plurality of lines, the $n^{th}$ line being a line estimated to have a possibility of sticking, and
output specific line data for specifying the specific line, to the printing apparatus, and
wherein the processor is configured to:
set a second period within the setting period, the second period being a time period for adjusting a temperature change of the plurality of heat-generating elements of the thermal head without printing on the medium, and the second period being set to a timing after a first period, the first period being a time period for printing on the medium,
set at least the $n^{th}$ line and a $(n-1)^{th}$ line is to be printed immediately before printing of the $n^{th}$ line, as a target line group, the $(n-1)^{th}$ line is to be printed immediately before printing of the $n^{th}$ line based on the printing data, so as to suppress the sticking.

14. The printing system according to claim 13, wherein the computer is configured to execute the determination of the $n^{th}$ line, and the output of the specific line data to the printing apparatus, before the printing apparatus executes the printing, and
wherein the processor is configured to:
generate countermeasure data for adjusting the temperature change of at least a part of the plurality of heat-generating elements based on the printing data so as to suppress the occurrence of sticking in the second periods, and
execute the generation of the countermeasure data before the printing apparatus executes the printing.

15. A printing control method of a printing apparatus,
wherein the printing apparatus includes a thermal head which is configured to print an image on a plurality of lines on a medium,
wherein the thermal head includes a plurality of heat-generating elements configured to generate heat when a voltage is applied thereto, and the thermal head is controlled to print on the plurality of lines in the medium in setting periods, and wherein the printing control method comprises:

setting a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium, determining a $n^{th}$ line (n: an integer of 2 or greater) among the plurality of lines in the medium based on printing data for printing the image, the $n^{th}$ line being a line estimated to have a possibility of sticking, and adjusting a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

16. The printing method according to claim 15, further comprising:

generating countermeasure data for adjusting the temperature change of at least a part of the plurality of heat-generating elements so as to suppress the sticking in the second periods, and executing the determination of the $n^{th}$ line and the generation of the countermeasure data, before executing the printing by the thermal head.

17. A non-transitory computer-readable recording medium having a printing control program for controlling a printing apparatus recorded therein, wherein the printing apparatus includes a thermal head which is configured to print an image on a plurality of lines in a medium, wherein the thermal head includes a plurality of heat-generating elements configured to generate heat when a voltage is applied thereto, and the thermal head is controlled to print on the plurality of lines in the medium in setting periods, and wherein the printing control program is configured to allow a computer:

to set a second period within one of the setting periods, the second period being a time period for adjusting a temperature change of the plurality of heat-generating elements of the thermal head without printing on the medium, and the second period being set to a timing after a first period in one of the setting periods, the first period being a time period for printing on the medium, to determine a $n^{th}$ line (n: an integer of 2 or greater) among the plurality of lines in the medium based on printing data for printing the image, the $n^{th}$ line being a line estimated to have a possibility of sticking, and to generate countermeasure data for adjusting a temperature change of at least a part of the plurality of heat-generating elements in the second periods corresponding to at least the $n^{th}$ line and a $(n-1)^{th}$ line as a target line group, the $(n-1)^{th}$ line is to be printed immediately before printing of the $n^{th}$ line based on the printing data, so as to suppress the sticking.

* * * * *